US010008956B2

(12) United States Patent
Sakakibara

(10) Patent No.: US 10,008,956 B2
(45) Date of Patent: Jun. 26, 2018

(54) POWER CONVERTER CONTROL DEVICE

(71) Applicant: DAIKIN INDUSTRIES, LTD., Osaka-Shi, Osaka (JP)

(72) Inventor: Kenichi Sakakibara, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days. days.

(21) Appl. No.: 15/558,885

(22) PCT Filed: Mar. 16, 2016

(86) PCT No.: PCT/JP2016/058246
§ 371 (c)(1),
(2) Date: Sep. 15, 2017

(87) PCT Pub. No.: WO2016/148164
PCT Pub. Date: Sep. 22, 2016

(65) Prior Publication Data
US 2018/0062542 A1   Mar. 1, 2018

(30) Foreign Application Priority Data
Mar. 18, 2015 (JP) ................. 2015-054337

(51) Int. Cl.
*H02M 5/458* (2006.01)
*H02M 7/5387* (2007.01)
(Continued)

(52) U.S. Cl.
CPC ..... *H02M 7/53873* (2013.01); *H02M 5/4585* (2013.01); *H02M 7/219* (2013.01); *H02P 27/08* (2013.01)

(58) Field of Classification Search
CPC ............ H02M 7/00; H02M 7/02; H02M 7/04; H02M 7/12; H02M 7/21; H02M 7/217;
(Continued)

(56) References Cited

U.S. PATENT DOCUMENTS 6,995,992 B2   2/2006  Wei et al.

FOREIGN PATENT DOCUMENTS

| JP | 2004-266972 A | 9/2004 |
| JP | 4135026 B2 | 8/2008 |
| JP | 2011-193678 A | 9/2011 |

OTHER PUBLICATIONS

Fujita et al., "Application and Development of the Three Phase Indirect Matrix Converter for Air Conditioners", The papers of Joint Technical Meeting on Semiconductor Power Converter/Vehicle Technology/Home and Consumer Appliances, SPC-12-175/VT-12-025/HCA-12-059, IEE Japan 2012(20), Dec. 6, 2012, pp. 31-36.
(Continued)

*Primary Examiner* — Timothy J Dole
*Assistant Examiner* — Carlos Rivera-Perez
(74) *Attorney, Agent, or Firm* — Birch, Stewart, Kolasch & Birch, LLP

(57) ABSTRACT

In a first period having a first period length, first data and second data are alternately given to an inverter control unit. The first data has a first value indicating a length of time from the start point of time of the first period to a matching point of time as a point of time when a converter carrier takes a converter threshold value and an inverter threshold value corresponding to a second period having the first value as its length. The second data has a second value indicating a length of time from the matching point of time to the end point of time of the first period and an inverter threshold value corresponding to a second period having the second value as its length.

10 Claims, 22 Drawing Sheets

(51) Int. Cl.
  *H02M 7/219* (2006.01)
  *H02P 27/08* (2006.01)
(58) Field of Classification Search
  CPC ...... H02M 7/219; H02M 7/2176; H02M 7/42;
  H02M 7/44; H02M 7/48; H02M 7/53;
  H02M 7/537; H02M 7/5387; H02M
  7/53871; H02M 7/53873; H02M 7/5388;
  H02M 5/00; H02M 5/40; H02M 5/42;
  H02M 5/44; H02M 5/453; H02M 5/4585;
  H02M 5/458; H02M 1/08; H02M 1/081;
  H02M 1/083; H02M 1/084; H02M 1/36;
  H02M 2001/0067; H02M 2001/007;
  H02M 2007/2195; H02M 2007/53878;
  H02P 27/10; H02P 27/12; H02P 27/14;
  H02P 27/08; H02P 27/085
  USPC ..... 363/16, 21.02, 21.03, 34–38, 40–48, 65,
  363/74, 95–99, 106, 108, 109, 123–127,
  363/131–134; 323/205–211, 222–226,
  323/266, 268–275, 282–286, 351;
  327/130, 131–143, 172–180;
  375/237–239
  See application file for complete search history.

(56) References Cited

OTHER PUBLICATIONS

International Search Report (PCT/ISA/210) issued in PCT/JP2016/058246, dated Jun. 7, 2016.
Renesas Electronics Application Note: RX62T—MTU3 Complementary PWM mode, R01AN0731ET0101, Jul. 12, 2011, 13 pages.
Renesas Electronics Application Note: RX62T—MTU3 Complementary PWM mode, R01AN0731JT0101, Sep. 21, 2011, 15 pages.
Renesas Electronics Application Note: RX62T Group—Usage Example of 12-Bit AD Converter in One Shunt Current Detection Method, R01AN0821EJ0100, Feb. 17, 2012, 24 pages.
Renesas Electronics Application Note: RX62T Group—Usage Example of 12-Bit AD Converter in One Shunt Current Detection Method, R01AN0821JJ0100, Feb. 17, 2012, 24 pages.
Wei et al., "Investigation of 9-switch Dual-bridge Matrix Converter Operating under Low Output Power Factor", IEEE IAS2003, vol. 1, pp. 176-181.
Wei et al., "Matrix Converter Topologies With Reduced Number of Switches", PESC 2002, vol. 1, Jun. 23-27, 2002, pp. 57-63.

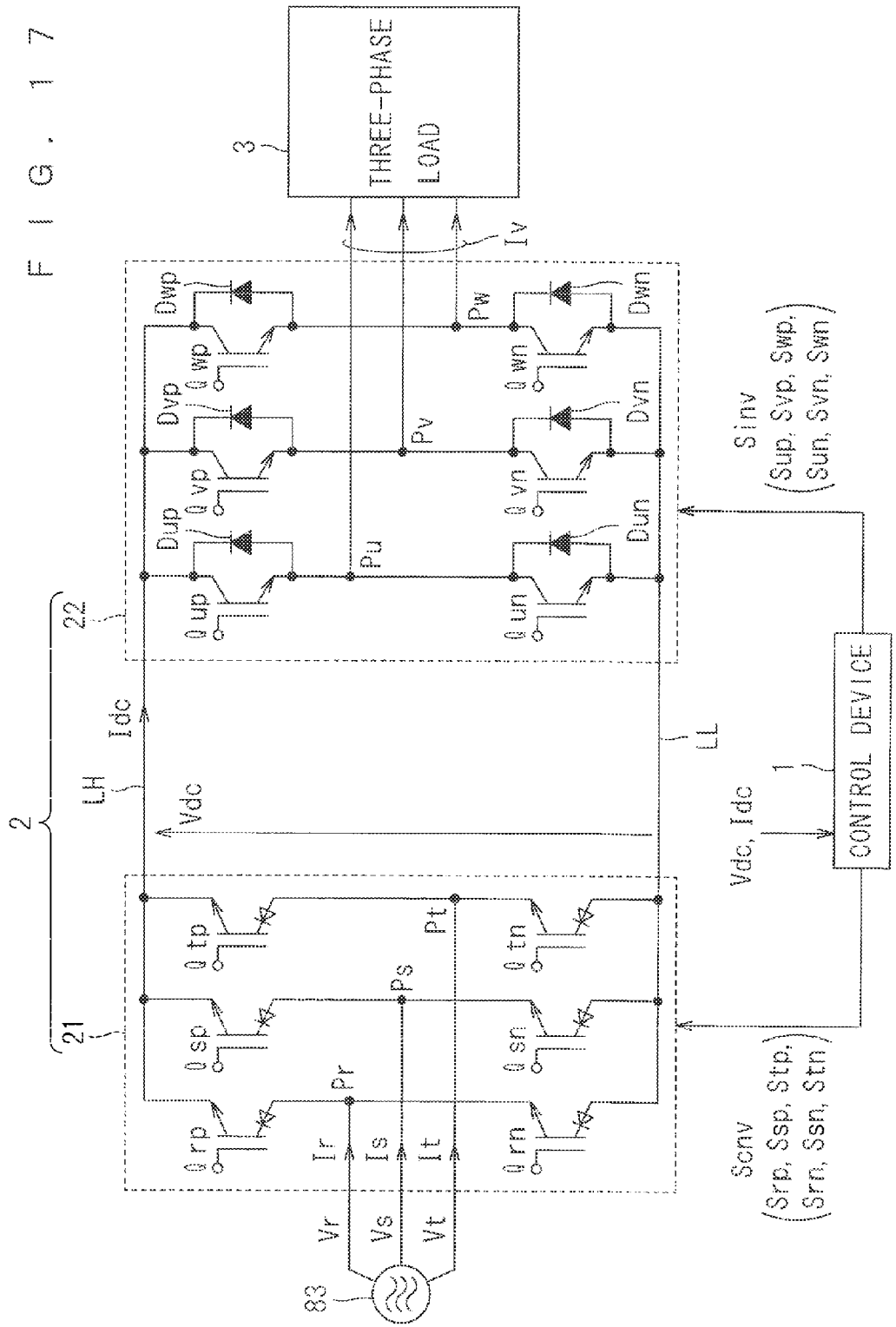
F I G . 1 7

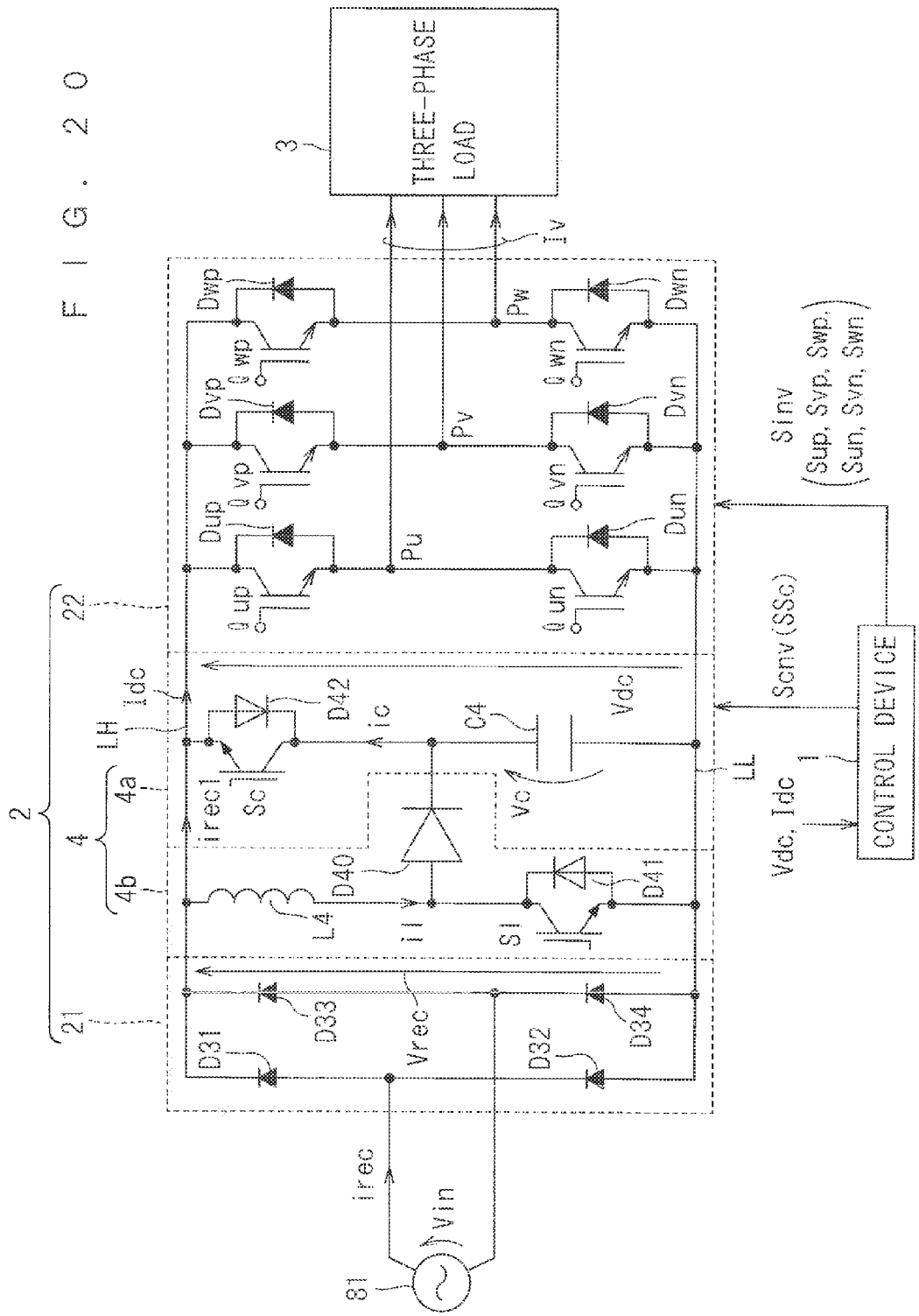
F I G . 2 0

F I G. 2 1
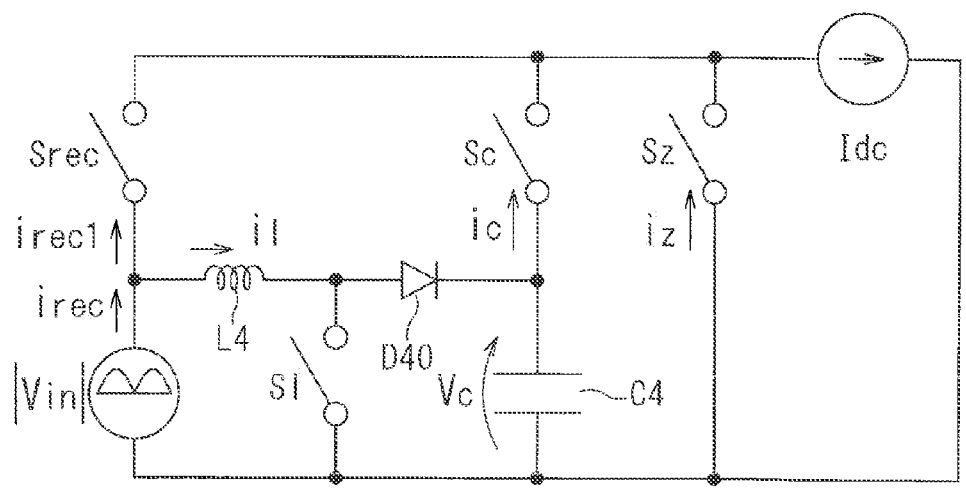

F I G. 2 4
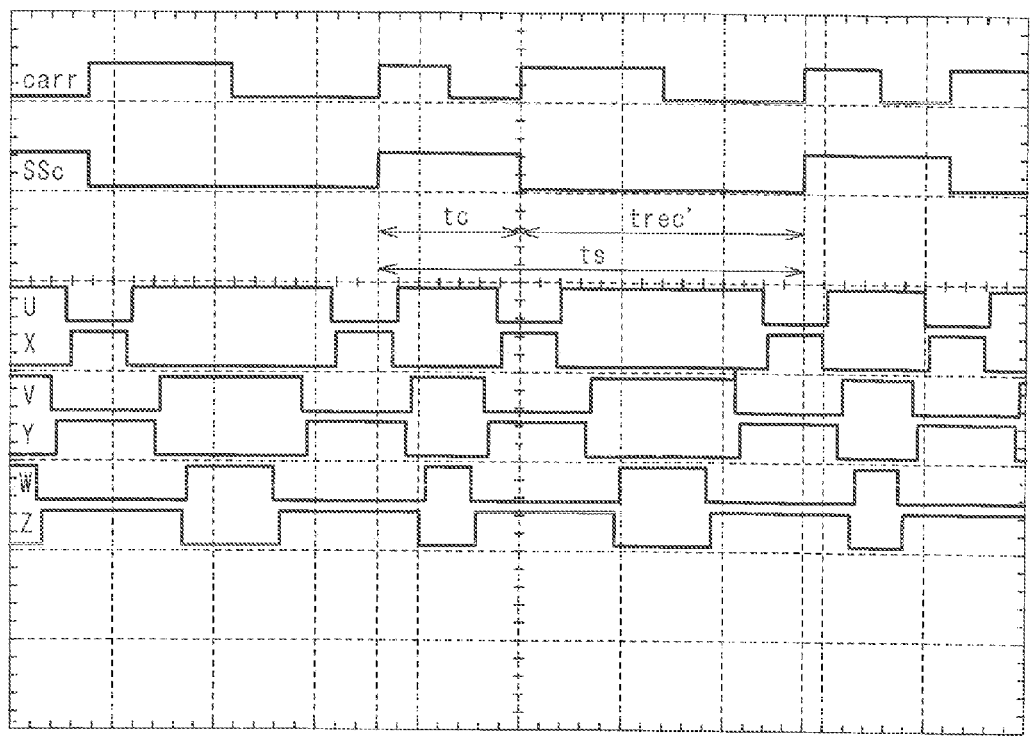

POWER CONVERTER CONTROL DEVICE

TECHNICAL FIELD

The present invention relates to a technology for controlling a power converter, and particularly, a direct-type power converter (hereinafter, referred to as "direct power converter").

BACKGROUND ART

As a typical main circuit configuration of an AC power converter that performs AC/AC conversion (hereinafter, such an AC power converter is simply referred to as "power converter"), an indirect power converter is generally used, which converts a commercial AC into a DC via a rectifier circuit and a smoothing circuit, and obtains an AC output by a voltage source inverter.

Meanwhile, as a mode of directly obtaining an AC output from an AC voltage, a mode using a direct power converter typified by a matrix converter is known. This eliminates a necessity to use large capacitors and reactors, which smooth voltage pulsation due to a commercial frequency, and accordingly, size reduction of the converter can be expected, and in recent years, this direct power converter has been drawing attention as a next-generation power converter.

For the direct power converter, a configuration with a DC link has also been proposed, and a configuration without a smoothing circuit in a DC link on an input side of an inverter and a principle of a modulation mode in the configuration are described in U.S. Pat. No. 6,995,992, Wei, L., Lipo, T. A., Chan, H, "Matrix Converter Topologies With Reduced Number of Switches," PESC 2002, Jun. 23-27, 2002, vol. 1, pp 57-63 and L. Wei, T. A. Lipo, "Investigation of 9-switch Dual-bridge Matrix Converter Operating under Low Output Power Factor," IEEE IAS2003, vol. 1, pp. 176-181. Here, with regard to the modulation mode, a method for generating a signal wave is described in detail; however, with regard to synchronization between the rectifier circuit and the inverter, FIG. 10 is only shown in Wei, L., Lipo, T. A., Chan, H, "Matrix Converter Topologies With Reduced Number of Switches," PESC 2002, Jun. 23-27, 2002, vol. 1, pp 57-63, and FIG. 12 is only shown in Japanese Patent Application Laid-Open No. 2004-266972.

Moreover, Wei, L., Lipo, T. A., Chan, H, "Matrix Converter Topologies With Reduced Number of Switches," PESC 2002, Jun. 23-27, 2002, vol. 1, pp 57-63 describes that a direct power converter with a DC link is controlled by using a DSP (Digital Signal Processor) and a CPLD (Complex Programmable Logic Device). However, details of logic adopted in the DSP and the CPLD are not disclosed.

Meanwhile, as a modulation mode similar to those of U.S. Pat. No. 6,995,992, Wei, L., Lipo, T. A., Chan, H, "Matrix Converter Topologies With Reduced Number of Switches," PESC 2002, Jun. 23-27, 2002, vol. 1, pp 57-63 and L. Wei, T. A. Lipo, "Investigation of 9-switch Dual-bridge Matrix Converter Operating under Low Output Power Factor," IEEE IAS2003, vol. 1, pp. 176-181, a modified symmetrical triangular wave mode is shown in Japanese Patent Application Laid-Open No. 2004-266972. FIG. 3 in Japanese Patent Application Laid-Open No. 2004-266972 shows a specific configuration of a modulator. An up/down command of an inverter-side carrier is outputted based on an up/down signal of a carrier on a rectifier side and on an output pulse obtained by a PWM (pulse width modulation) on the rectifier side. However, in Japanese Patent Application Laid-Open No. 2004-266972, as apparent from FIG. 4 thereof, the same thing as that in Wei, L., Lipo, T. A., Chan, H, "Matrix Converter Topologies With Reduced Number of Switches," PESC 2002, Jun. 23-27, 2002, vol. 1, pp 57-63. is merely shown as a result.

Note that, in FIG. 8 of Japanese Patent No. 4135026, a mode of modulating by the inverter and the converter using the same carrier is shown.

Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174NT-12-025/HCA-12-059, IEE Japan 2012(20), pp. 31-36, 2012 Dec. 6 shows that a modulation is realized by a microcomputer and an FPGA (Field-Programmable Gate Array).

Note that Japanese Patent Application Laid-Open No. 2011-193678, Renesas Electronics Application Note: RX62T Group—Usage Example of 12-Bit AD Converter in One Shunt Current Detection Method, R01AN0821JJ0100 and Renesas Electronics Application Note: RX62T-MTU3 Complementary PWM mode, R01AN0731JT0101, which are related to the present application, are listed in addition to the above.

SUMMARY OF INVENTION

Problems to be Solved by the Invention

As described above, special logic has been required for the modulator of the conventional direct power converter, and it has been necessary to accompany with a logic IC such as a CPLD or an FPGA.

On the other hand, as a microcomputer suitable for controlling the inverter using the PWM modulation, there are ones introduced in Renesas Electronics Application Note: RX62T Group—Usage Example of 12-Bit AD Converter in One Shunt Current Detection Method, R01AN0821JJ0100 and Renesas Electronics Application Note: RX62T-MTU3 Complementary PWM mode, R01AN0731JT0101. Hence, it is desirable to control the direct power conversion device by such a microcomputer without using the logic IC from a viewpoint of hardware reduction.

In this connection, it is an object of the present invention to provide a technology for controlling the direct power converter by the microcomputer without using the logic IC.

Means for Solving the Problems

A power converter control device according to the present invention is a power converter control device (1) for controlling a power converter (2) including a converter (21) that performs AC-DC conversion and an inverter (22) that receives a DC voltage (Vdc) from the converter and supplies a multi-phase AC current (Iv).

Then, a first aspect of the present invention includes: a converter control unit (11) that outputs a converter switching signal (Scnv) for determining switching of the converter based on a result of performing comparison between a converter carrier (K1) and a converter threshold value (Ccnv) in each of first periods (P) repeated while having a first period length (Tcnv); and an inverter control unit (12) that outputs an inverter switching signal (Sinv) for determining switching of the inverter based on a result of performing comparison between an inverter carrier (K2) and an inverter threshold value (Dpwm) in each of second periods (Q1, Q2) synchronized with the converter carrier and repeated while having a second period length (Tinv).

Then, in the first period, first data (Data1) and second data (Data2) are alternately given to the inverter control unit, the first data (Data1) including a first value (Tinv1) indicating a length of time from a start point of time of the first period to a matching point of time (J) as a point of time when the converter carrier takes the converter threshold value and the inverter threshold value (Dpwm1) corresponding to the second period (Q1) having the first value as the second period length, and the second data (Data2) including a second value (Tinv2) indicating a length of time from the matching point of time to an end point of time of the first period and the inverter threshold value (Dpwm2) corresponding to the second period (Q2) having the second value as the second period length.

A second aspect of the power converter control device according to the present invention is the first aspect thereof further including: an arithmetic processing unit (10) that performs arithmetic processing for obtaining the first data (Data1) and the second data (Data2) for a pair of the second periods, the arithmetic processing being performed every first period.

Then, the inverter control unit (12) includes: a buffer register (124a, 124c) which stores the inverter threshold value (Dpwm) and the second period length (Tinv); a compare register (123a, 123c) to which contents stored by the buffer register are transferred at a boundary point of time as a point of time serving as a boundary between the second periods; a timer (121) that generates a count value that is compared with the second period length stored in the compare register and becomes the inverter carrier (K2); and a switching signal generation unit (128) that generates the inverter switching signal (Sinv) on the basis of the result of the comparison between the inverter threshold value stored in the compare register and the inverter carrier.

Then, the first data (Data1[$k$+1]) obtained by the arithmetic processing in one of the first periods (P[$k$]) is stored in the buffer register before the start of another (P[$k$+1]) of the first periods, the second data (Data2[$k$+1]) obtained by the arithmetic processing in the one of the first periods is stored in the buffer register on an occasion of the start of the another of the first periods, and the another of the first periods is present immediately after the one of the first periods.

A third aspect of the power converter control device according to the present invention is the second aspect thereof, wherein the first data (Data1): (a) on and after an end time of the arithmetic processing when the boundary point of time is present after the start of the arithmetic processing and before the end of the arithmetic processing; (b) when the boundary point of time is not present after the start of the arithmetic processing and before the end of the arithmetic processing, by processing by an interrupt command occurring at a first one of the boundary point of time after the end of the arithmetic processing; is stored in the buffer register in these individual cases.

A fourth aspect of the power converter control device according to the present invention is the third aspect thereof, wherein the first data (Data1): (a1) is stored in the buffer register at the time when the arithmetic processing is ended when the boundary point of time is present after the start of the arithmetic processing and before the end of the arithmetic processing.

A fifth aspect of the power converter control device according to the present invention is the third aspect thereof, wherein the first data (Data1): (a2) when the boundary point of time is present after the start of the arithmetic processing and before the end of the arithmetic processing, is stored in the buffer register by interrupt handling by an interrupt command occurring at a first one of the boundary point of time after the end of the arithmetic processing.

A sixth aspect of the power converter control device according to the present invention is any one of the first to fifth aspects thereof, wherein the inverter carrier (K2) exhibits a single triangular wave in each of the second periods.

A seventh aspect of the power converter control device according to the present invention is any one of the first to fifth aspects thereof, wherein the converter carrier (K1) repeats a monotonic increase and a monotonic decrease every first period, and the inverter carrier (K2) repeats a monotonic increase and a monotonic decrease every second period.

An eighth aspect of the power converter control device according to the present invention is any one of the first to fifth aspects thereof, wherein the converter carrier (K1) exhibits a sawtooth wave having the first period length (Tcnv) as a cycle, and the inverter carrier (K2) repeats a monotonic increase and a monotonic decrease every second period.

In the first to eighth aspects of the power converter control device according to the present invention, for example, the converter (21) is a current source converter, and commutates at the matching point of time by the converter switching signal (Scnv).

In the first to eighth aspects of the power converter control device according to the present invention, for example, the converter (21) includes a rectifier circuit and a booster circuit, and it is determined whether or not the booster circuit contributes to the DC voltage (Vdc) on the basis of the converter switching signal (Scnv).

Effects of the Invention

In accordance with the first aspect of the power converter control device according to the present invention, the number of complementary PWM modulators required is saved to be one, for the control for dividing one cycle for controlling the converter into two sections at the point of time when the converter commutates, and for controlling the inverter in the respective sections.

In accordance with the second aspect of the power converter control device according to the present invention, write into the buffer register follows transfer from the buffer register to the compare register, and accordingly, comparison between the first data and the second data, and the inverter carrier is appropriately performed.

The third to sixth aspects of the power converter control device according to the present invention contribute to the realization of the second aspect of each thereof.

In accordance with the seventh to eighth aspects of the power converter control device according to the present invention, responsiveness of the output of the inverter is improved.

In particular, in accordance with the eighth aspect of the power converter control device according to the present invention, a range of options for selecting the timer to be adopted is widened.

Objects, features, aspects and advantages of the present invention will be more obvious by the following detailed description and the accompanying drawings.

BRIEF DESCRIPTION OF DRAWINGS

FIG. 17 is a block diagram illustrating a configuration of a power converter adopted in a fourth embodiment;

FIG. 20 is a block diagram illustrating a configuration of a power converter adopted in a fifth embodiment;

FIG. 21 is a circuit diagram showing an equivalent circuit of a circuit shown in FIG. 20;

FIG. 24 is a graph showing behaviors of a variety of amounts in an example of the fifth embodiment.

DESCRIPTION OF EMBODIMENTS

First Embodiment

A. Configuration

Figure 1:
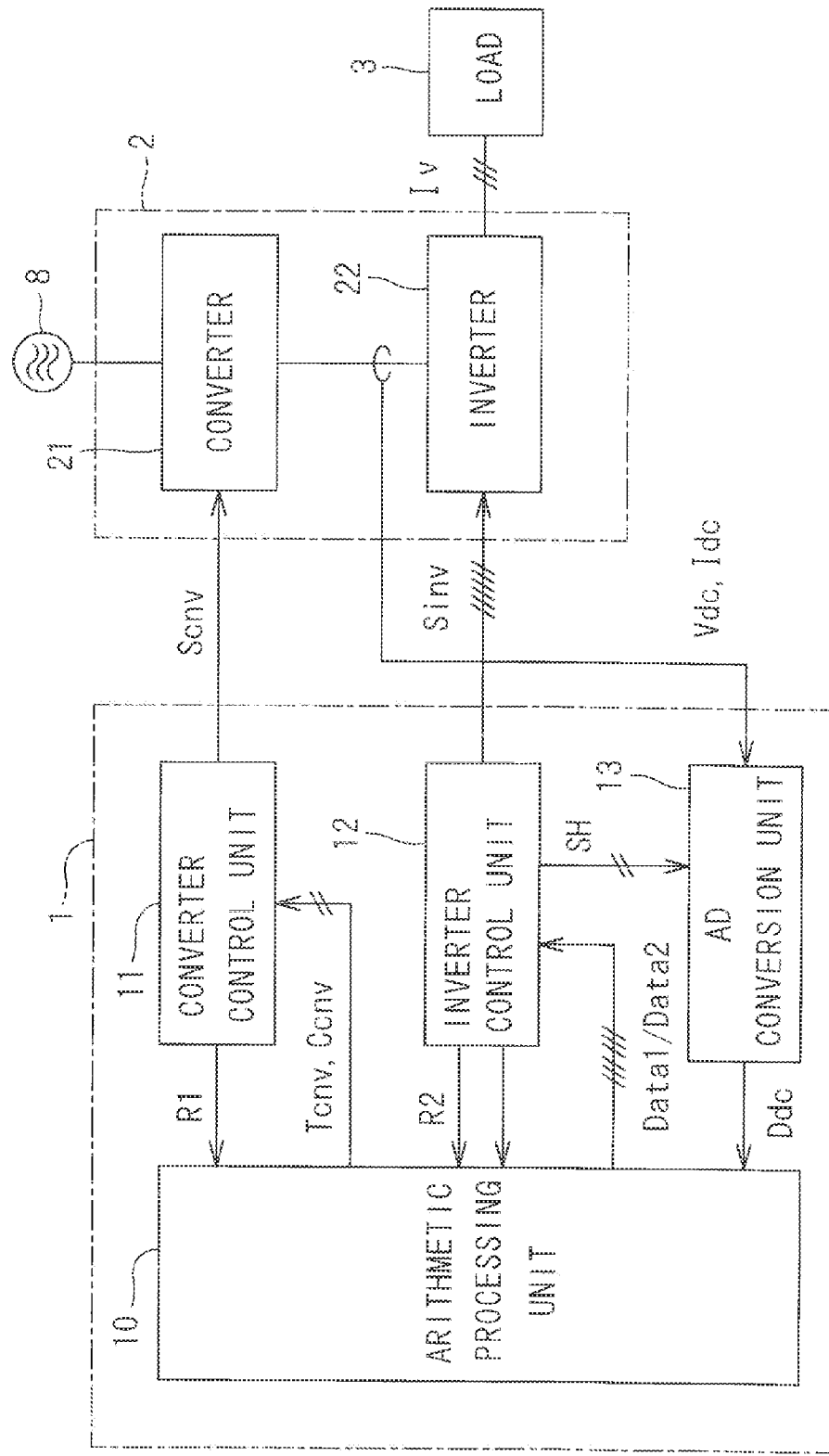
FIG. 1 is a block diagram illustrating a configuration of a power converter control device according to a first embodiment and a configuration of a power converter to be controlled thereby.

FIG. 1 is a block diagram illustrating a configuration of a power converter control device 1 according to this embodiment and a configuration of a power converter 2 to be controlled thereby.

The power converter 2 supplies a multi-phase AC current Iv to a load 3. The power converter 2 includes a converter 21 and an inverter 22. The converter 21 performs AC/DC conversion for an AC voltage, which is obtained from an AC power supply 8, and outputs a DC voltage Vdc. The inverter 22 receives the DC voltage Vdc from the converter 21, and outputs the multi-phase AC current Iv. For example, the load 3 is a three-phase balanced load, more specifically a three-phase motor, and the multi-phase AC current Iv is a three-phase current.

The power converter control device 1 controls the power converter 2. The power converter control device 1 includes: an arithmetic processing unit 10; a converter control unit 11; an inverter control unit 12; and an AD conversion unit 13.

In the converter control unit 11, a converter switching signal Scnv that determines switching of the converter 21 is outputted. In the inverter control unit 12, an inverter switching signal Sinv that determines switching of the inverter 22 is outputted.

The converter switching signal Scnv is determined on the basis of a result of comparing, with each other, a converter threshold value Ccnv and a converter carrier (not shown in FIG. 1) in each of first periods repeated while having a first period length Tcnv.

The inverter switching signal Sinv is determined on the basis of a result of comparing, with each other, an inverter threshold value (not shown in FIG. 1) obtained from first data Data1 (or second data Data2) and an inverter carrier (not shown in FIG. 1). The inverter carrier is determined on the basis of a result of being compared with the converter carrier (not shown in FIG. 1) in each of second periods repeated while having a second period length obtained from the first data Data1 (or the second data Data2).

The AD conversion unit 13 receives the DC voltage Vdc and a DC current Idc from the power converter 2, the DC current Idc flowing between the inverter 22 and the converter 21. The AD conversion unit 13 receives a sample/hold signal SH from the inverter control unit 12. The AD conversion unit 13 performs analog/digital conversion for the DC voltage Vdc and the DC current Idc, which are sampled/held by the sample/hold signal SH, and obtains digital values Ddc of them.

The sample/hold signal SH is determined on the basis of a result of comparing, with each other, a sample timing signal (not shown in FIG. 1) obtained from the first data Data1 (or the second data Data2) and the inverter carrier.

The arithmetic processing unit 10 generates the first data Data1 and the second data Data2 by arithmetic processing that is based on the digital values Ddc and other parameters (not shown) necessary to control the power converter 2. For example, when the load 3 is a motor, the digital values Ddc are used for estimating a magnetic pole position of the motor. Such arithmetic processing is started by an interrupt command R1 from the converter control unit 11. The first data Data1 and the second data Data2 are outputted to the inverter control unit 12 at different timings. The timings will be described in detail later; however, the timings are determined at an end of the above-mentioned arithmetic processing or by an interrupt command R2 from the inverter control unit 12.

Figure 2:
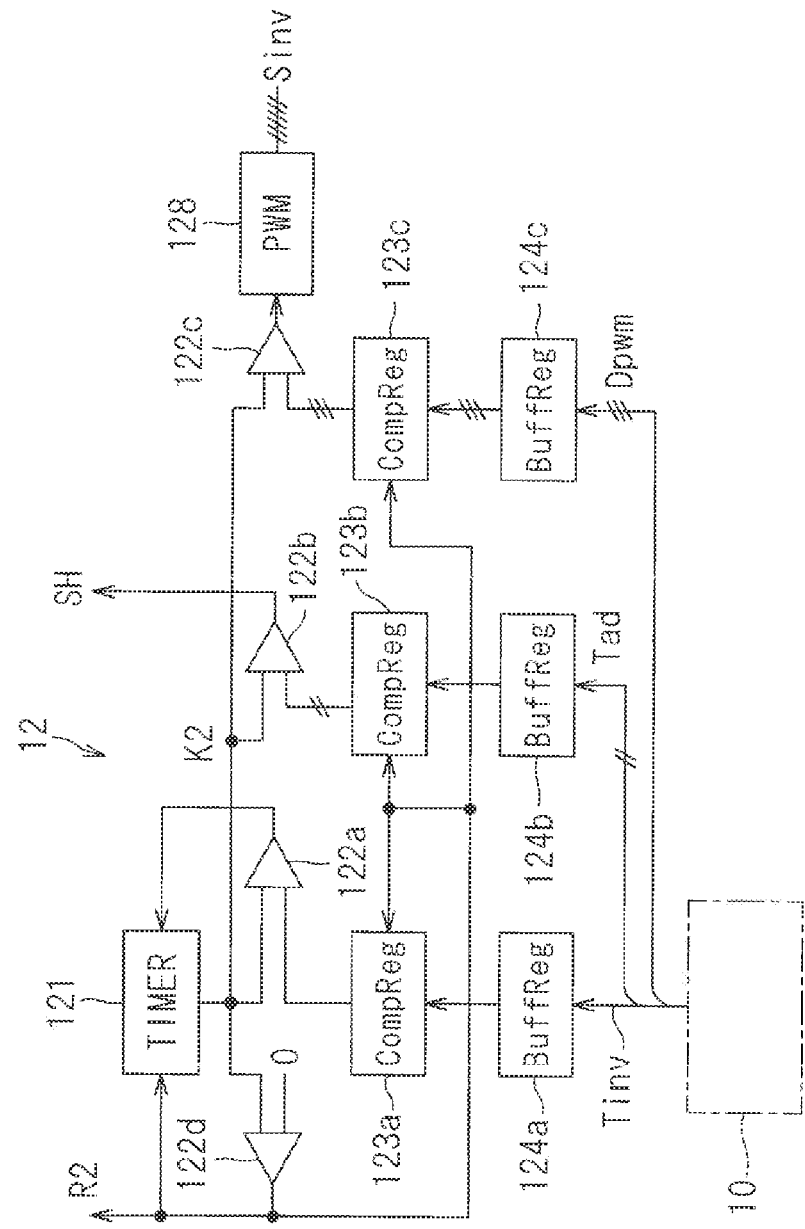
FIG. 2 is a block diagram illustrating a configuration of an inverter control unit in the first embodiment.

FIG. 2 is a block diagram schematically illustrating a configuration of the inverter control unit 12 in this embodiment. The inverter control unit 12 includes: a timer 121; comparators 122a, 122b, 122c and 122d; compare registers (denoted by "CompReg" in the FIGS. 123a, 123b and 123c; buffer registers (denoted by "BuffReg" in the FIGS. 124a, 124b and 124c; and a switching signal generation unit 128. Such a schematic configuration can be realized by a configuration commonly known, for example, as a generally called multi-function timer pulse unit. The multi-function timer pulse unit is included in a known single-chip microcomputer (for example, refer to Renesas Electronics Application Note: RX62T Group—Usage Example of 12-Bit AD Converter in One Shunt Current Detection Method, R01AN0821JJ0100 and Renesas Electronics Application Note: RX62T-MTU3 Complementary PWM mode, R01AN0731JT0101). The configuration shown in FIG. 2 is a schematic one, and a configuration reflecting this is not always adopted in the multi-function timer pulse unit.

A second period length Tinv, a sample timing signal Tad, and an inverter threshold value Dpwm are inputted to the buffer registers 124a, 124b and 124c, respectively. These are obtained as the first data Data1 (or the second data Data2) from the arithmetic processing unit 10.

Contents stored by the buffer registers 124a, 124b and 124c are transferred to the compare registers 123a, 123b and 123c, respectively, simultaneously with occurrence of the interrupt command R2. In FIG. 2, an output of the comparator 122d functions as the interrupt command R2, and in addition, serves as a transfer command for transfer from the buffer registers 124a, 124b and 124c to the compare registers 123a, 123b and 123c.

The contents stored in the compare registers 123a, 123b and 123c are all compared with a count value outputted from the timer 121.

The timer 121 functions as an up/down counter. The timer 121 counts up by the interrupt command R2. The timer 121 counting up, and the count value reaching the second period length Tinv stored in the compare register 123a, an output of the comparator 122a is activated, and causes the timer 121 to count down. The timer 121 counting down and the count value reaching a predetermined minimum value (for example, 0), the interrupt command R2 occurs by a function of the comparator 122d.

By appropriately setting timing at which the count value of the timer 121 is updated, the count value concerned becomes an inverter carrier K2 exhibiting a single triangular wave in the second period length Tinv. Then, the interrupt command R2 occurs at a predetermined minimum value (for example, 0). That is, the interrupt command R2 occurs at a trough of the triangular wave in the inverter carrier K2. Hence, thereafter, the interrupt command R2 is sometimes referred to as "trough interrupt".

Note that timing at which the output of the comparator 122a is activated corresponds to a position of a crest of the triangular wave in the inverter carrier K2. Hence, when the activation of the output of the comparator 122a is adopted as such an interrupt command, the interrupt command concerned is sometimes referred to as "crest interrupt".

The inverter carrier K2 is compared with the sample timing signal Tad, which is stored in the compare register 123b, in the comparator 122b. Note that, when the load 3 is a three-phase load, the inverter 22 also outputs a three-phase AC in accordance with pulse width modulation (PWM), and accordingly, there are two kinds of the sample timing signal Tad. Hence, there are also two kinds of output of the comparator 122b, and the sample/hold signal SH is activated twice in the period having the second period length Tinv.

The inverter carrier K2 is compared with the inverter threshold value Dpwm, which is stored in the compare register 123c, in the comparator 122c. Note that, when the inverter 22 outputs the three-phase AC, there are three or two kinds of the inverter threshold value Dpwm. Hence, there are also three or two kinds of output of the comparator 122c.

The switching signal generation unit 128 receives the output of the comparator 122c, and generates the inverter switching signal Sinv. For example, when the inverter 22 outputs the three-phase AC, there are six kinds of the inverter switching signal Sinv. A technology for generating the inverter switching signal Sinv from the output of the comparator 122c is known in, for example, Japanese Patent Application Laid-Open No. 2004-266972 and Japanese Patent No. 4135026, and accordingly, details thereof are omitted here.

Figure 3:
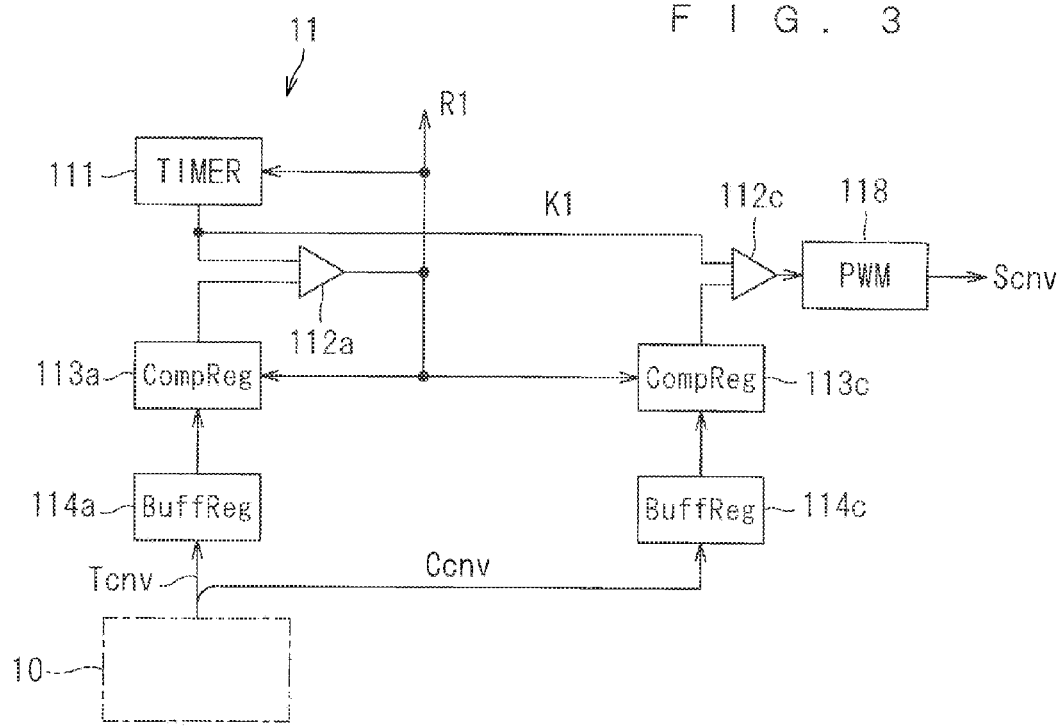
FIG. 3 is a block diagram illustrating a configuration of a converter control unit in the first embodiment.

FIG. 3 is a block diagram schematically illustrating a configuration of the converter control unit 11 in this embodiment. The converter control unit 11 includes: a timer 111; comparators 112a and 112c; compare registers (denoted by "CompReg" in the FIGS. 113a and 113c; buffer registers (denoted by "BuffReg" in the FIGS. 114a and 114c; and a switching signal generation unit 118. Such a schematic configuration can be realized by a general-purpose PWM timer, and in a similar way to the inverter control unit 12, is a known configuration included in a single-chip microcomputer. The configuration shown in FIG. 3 is a schematic one, and a configuration reflecting this is not always adopted in the general-purpose PWM timer.

A first period length Tcnv and a converter threshold value Ccnv are given from the arithmetic processing unit 10 to the buffer registers 114a and 114c, respectively.

Contents stored in the buffer registers 114a and 114c are transferred to the compare registers 113a and 113c, respectively, simultaneously with occurrence of the interrupt command R1. Here, activation of an output of the comparator 112a functions as occurrence of the interrupt command R1.

Contents stored in the compare registers 113a and 113c are both compared with a count value outputted from the timer 111.

The timer 111 functions as an up counter. The timer 111 counts up after being reset by the activation of the output of the comparator 112a. The timer 111 counting up, and the count value reaching the first period length Tcnv stored in the compare register 113a, the output of the comparator 112a is activated, and the interrupt command R1 occurs.

By appropriately setting timing at which the count value of the timer 111 is updated, the count value concerned becomes a converter carrier K1 exhibiting a sawtooth wave in the first period length Tcnv. Then, the interrupt command R1 occurs at a fall of the converter carrier K1.

Figure 4:
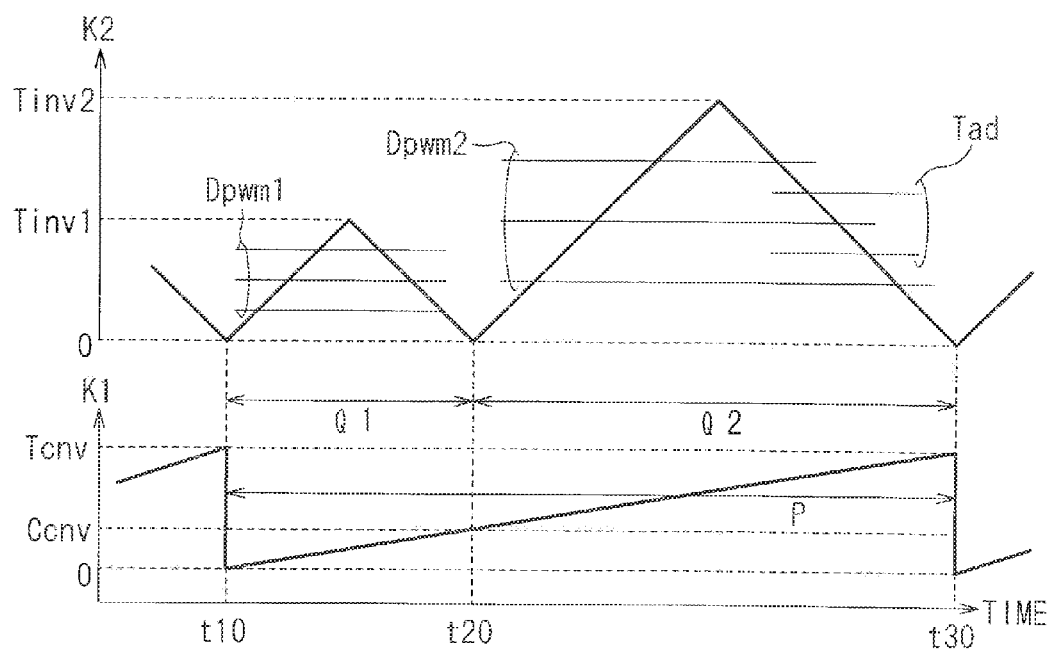
FIG. 4 is a graph showing a relationship between a converter carrier and an inverter carrier.

FIG. 4 is a graph showing a relationship between the converter carrier K1 and the inverter carrier K2, in which an axis of abscissas represents time. The timers 111 and 121 are driven in synchronization with each other, and here, it is illustrated that both the converter carrier K1 and the inverter carrier K2 take a value 0 at time t10, and that both are increased immediately thereafter.

When the converter carrier K1 reaches the value Tcnv, the converter carrier K1 falls as mentioned above. Here, a falling time t30 is adopted, and it can be understood that it is at the time t30 that the converter carrier K1 takes the value Tcnv, and accordingly, the time t30 is set as: t30=t10+Tcnv. That is, an inclination (rate of change of the count value with respect to time) of the converter carrier K1 is set to 1. As described above, in this embodiment, the converter carrier K1 exhibits a single sawtooth wave in the first period P repeated while having the first period length Tcnv.

When the inverter carrier K2 reaches a first value Tinv1, the inverter carrier K2 counts down as mentioned above. Then, the inverter carrier K2 reaches the value 0 at time t20. Here, the time t20 is a point of time when the converter carrier K1 takes the converter threshold value Ccnv, and the inclination of the converter carrier K1 is set to 1 as mentioned above, and accordingly, the time t20 is set as t20=t10+Ccnv. This is realized, for example, by setting Tinv1=Ccnv, and by setting an absolute value of an inclination of the inverter carrier K2 to 2.

Thereafter, the inverter carrier K2 counts up again, and when the inverter carrier K2 reaches a second value Tinv2, the inverter carrier K2 counts down as mentioned above. Then, the inverter carrier K2 reaches the value 0 at time t30. Here, t30=t20+Tinv2 is set. This is realized by setting Tinv2=Tcnv−Tinv1, and by setting the absolute value of the inclination of the inverter carrier K2 to 2.

As described above, in this embodiment, in each of a pair of second periods Q1 and Q2, which is repeated while having the second period lengths Tinv1 and Tinv2 in synchronization with the converter carrier K1, the inverter carrier K2 exhibits a single triangular wave in which the absolute values of the inclinations are equal to each other (2 in the above-mentioned example). Then, a sum of the second period lengths Tinv1 and Tinv2 is equal to the first period length Tcnv. In other words, the pair of second periods Q1 and Q2 divides the first period P into two in this order.

Then, the interrupt command R2 occurs at troughs of the triangular wave in the inverter carrier K2, and accordingly, results in occurring at boundary points of time between the second periods Q1 and Q2 (these points are illustrated by the times t10, t20 and t30 in FIG. 4).

Note that, in the following description, in some cases, the boundary point of time between the second periods Q1 and Q2 that divide the same first period P into two (this point is illustrated by the time t20 in FIG. 4) is particularly referred to as a matching point of time, and is distinguished from the boundary point of time between the second periods Q1 and Q2 that belong to the first periods P different from each other (this point is illustrated by each of the times t10 and t30 in FIG. 4).

The following expression can be obtained by using this matching point of time. The first value Tinv1 indicates a length of time from a start point of time of the first period P to the matching point of time at which the converter carrier K1 takes the converter threshold value Ccnv. The first data Data1 corresponds to the second period Q1 having the first value Tinv1 as the second period length, and includes an inverter threshold value Dwm1 considered in the second period Q1. The second value Tinv2 indicates a length of time from the matching point of time to an end point of time of the first period P. The second data Data2 corresponds to the second period Q2 having the second value Tinv2 as the second period length, and includes an inverter threshold value Dwm2 considered in the second period Q2. The sample timing signal Tad is included in the first data Data1 if the second period Q1 is longer than the second period Q2, and is included in the second data Data2 if the second period Q2 is longer than the second period Q1. Hereinafter, it is assumed that the second value Tinv2 is larger than the first value Tinv1, and the second data Data2 also includes the sample timing signal Tad.

In FIG. 4, in the second period Q1 in which the inverter carrier K2 has the second period length Tinv1 and exhibits a triangular wave, an inverter threshold value Dpwm1 to be compared with the inverter carrier K2 (here, a case where three kinds of the inverter threshold value Dpwm1 are present is shown assuming three-phase modulation) is also written. In a similar way, in the second period Q2 in which the inverter carrier K2 has the second period length Tinv2 and exhibits a triangular wave, an inverter threshold value Dpwm2 to be compared with the inverter carrier K2 (here, a case where three kinds of the inverter threshold value Dpwm2 are present is shown assuming the three-phase modulation) and two types of the sample timing signal Tad are also written.

B. Operation Explanation (b-1) Operation Explanation for Inverter Control Unit 12

Hereinafter, a description will be made of input timing of the following data to the inverter control unit 12, the data being the second period length Tinv for determining a waveform of the inverter carrier K2 as shown in FIG. 4, and the inverter threshold value Dpwm and the sample timing signal Tad, which are to be compared with the inverter carrier K2, that is, the first data Data1 and the second data Data2.

Figure 5:
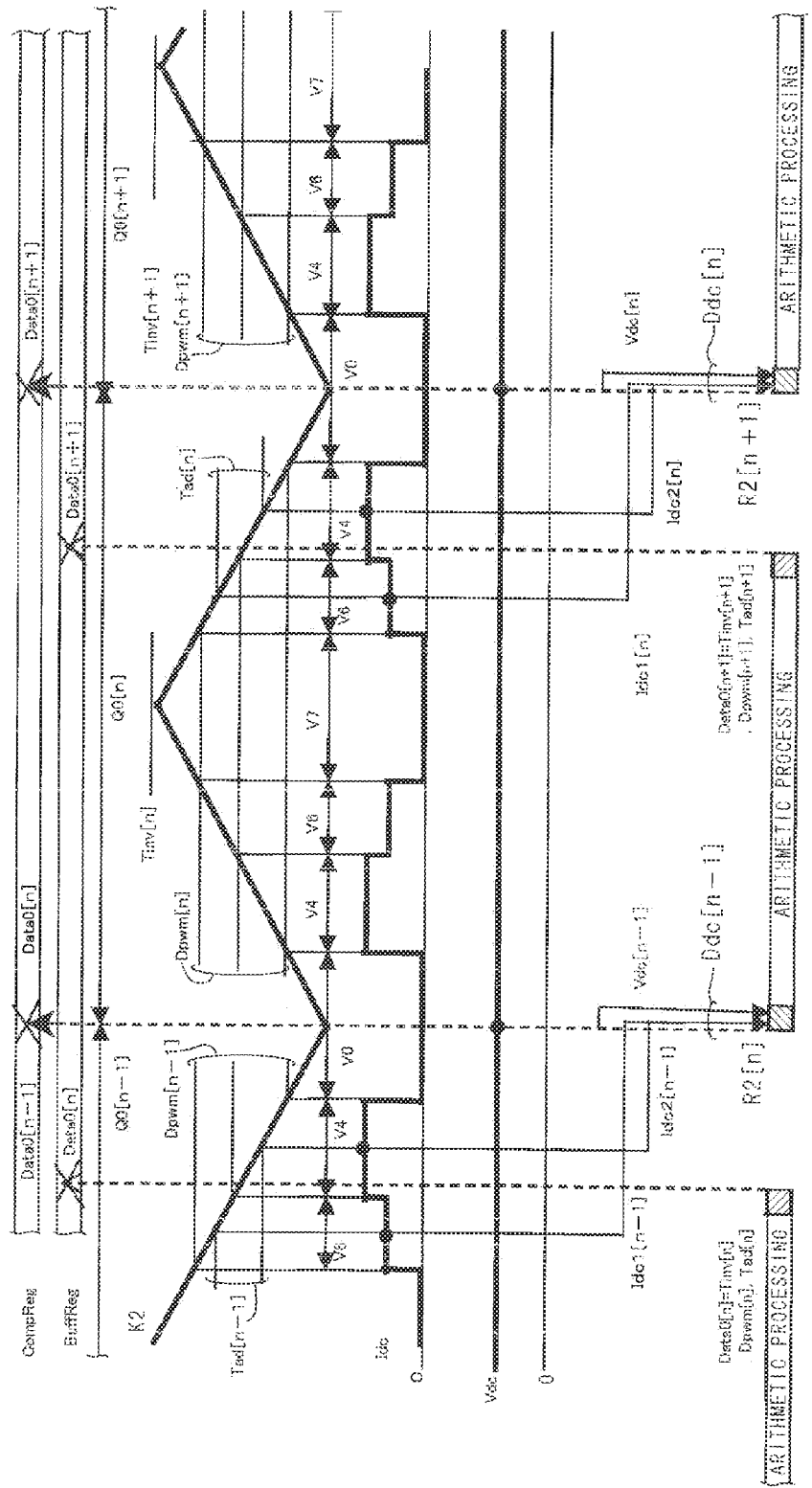
FIG. 5 is a timing chart showing operations of the inverter control unit and an arithmetic processing unit.

First, in order to briefly describe the operations of the inverter control unit 12, it is assumed that the converter 21 is just a DC voltage source that makes the DC voltage Vdc constant and supplies the DC voltage Vdc. FIG. 5 is a timing chart showing operations of the inverter control unit 12 and the arithmetic processing unit 10.

FIG. 5 adopts a lapse time in a right direction, collectively shows the compare registers 123a, 123b and 123c as the compare register CompReg, collectively shows the buffer registers 124a, 124b and 124c as the buffer register BuffReg, shows the inverter carrier K2, and the second period length Tinv, the inverter threshold value Dpwm, and the sample timing signal Tad, which are compared with the inverter carrier K2, voltage vectors, which indicate a switching state of the inverter 22, the DC voltage Vdc and the DC current Idc, and also shows the digital value Ddc and the interrupt command R2, which are inputted to the arithmetic processing unit 10.

Here, the operations themselves of the inverter 22, which are based on the voltage vectors, are known, for example, by Japanese Patent No. 4135026 and the like, and accordingly, a detailed description thereof will be omitted.

Moreover, it is assumed here that the converter 21 is just a DC source, and accordingly, a periodic operation thereof is not taken into consideration. Hence, the second period length Tinv, the inverter threshold value Dpwm, and the sample timing signal Tad, which are given to the inverter control unit 12, are collected as data Data0. In other words, the data Data0 can be considered as the first data Data1 in FIG. 1.

An interval between the troughs that are adjacent to each other in the inverter carrier K2, is understood as one cycle Q0, and is described. Then, for a variety of amounts in a k-th cycle (k is an integer), a symbol [k] is appended to a symbol indicating each of the variety of amounts.

By comparison between the inverter carrier K2 and a pair of sample timing signals Tad[n−1] of the (n−1)-th cycle Q0[n−1] (n is an integer), the sample/hold signal SH is activated twice. In this way, a measured value of the DC current Idc at the (n−1)-th cycle Q0[n−1] is obtained as DC currents Idc1[n−1] and Idc2[n−1].

Here, measurement of the DC currents Idc1[n−1] and Idc2[n−1] are performed when the inverter 22 is in switching states indicated by voltage vectors V6 and V4, respectively.

At a start point of time of the n-th cycle Q0[n], an interrupt command R2[n] occurs, and the arithmetic processing unit 10 starts arithmetic processing using the DC currents Idc1[n−1] and Idc2[n−1] and a DC voltage Vdc[n−1] (these are illustrated as a digital value Ddc[n−1]). Such arithmetic processing is performed as interrupt handling for another process (main routine) performed by the arithmetic processing unit 10.

In the figure, right-upward hatching shown at a left end of "arithmetic processing" indicates a time spent for acquiring the digital value Ddc (the same applies to the following figures).

By the arithmetic processing concerned, second period length Tinv[$n+1$], an inverter threshold value Dpwm[$n+1$] and a sample timing signal Tad[$n+1$] are obtained as data Data0[$n+1$]. The arithmetic processing for obtaining the data Data0 from the digital value Ddc is realized by a known motor control technology, and accordingly, a detailed description thereof will be omitted.

The data Data0[$n+1$] obtained in the arithmetic processing in the n-th cycle Q0[$n$] is written to the buffer register BuffReg, and further, is transferred to the compare register CompReg at timing when a next interrupt command R2[$n+1$] occurs (also refer to the output of the comparator 122$d$ in FIG. 2).

Note that, in the figure, left-upward hatching shown at a right end of "arithmetic processing" indicates a time spent for writing to the buffer register BuffReg accompanying the arithmetic processing (the same applies to the following figures).

The previous cycle is considered. The second period length Tinv[$n$], the inverter threshold value Dpwm[$n$] and the sample timing signal Tad[$n$], with which the inverter carrier K2 should be compared in the n-th cycle Q0[$n$], are already transferred to the compare register CompReg at the timing when the interrupt command R2[$n$] occurs. In this way, the comparison between the inverter carrier K2 and the data Data0[$n$] in the n-th cycle Q0[$n$] is appropriately executed.

In a similar way, the data Data0[$n+1$] obtained in the arithmetic processing in the n-th cycle Q0[$n$] is transferred to the compare register CompReg so as to catch in time the comparison for the inverter carrier K2 in the (n+1)-th cycle Q0($n$+1).

(b-2) Operation Explanation of Comparative Example

Next, for comparison with the technology described in FIG. 4, a description will be made of control, as in Japanese Patent No. 4135026 and Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174NT-12-025/HCA-12-059, IEE Japan 2012(20), pp. 31-36, 2012-12-06, for dividing one cycle for controlling the converter 21 into two sections at the time when the converter 21 commutates, and for controlling the inverter 22 in each of the sections (hereinafter, this control will be tentatively referred to as "two-division control").

Figure 6:
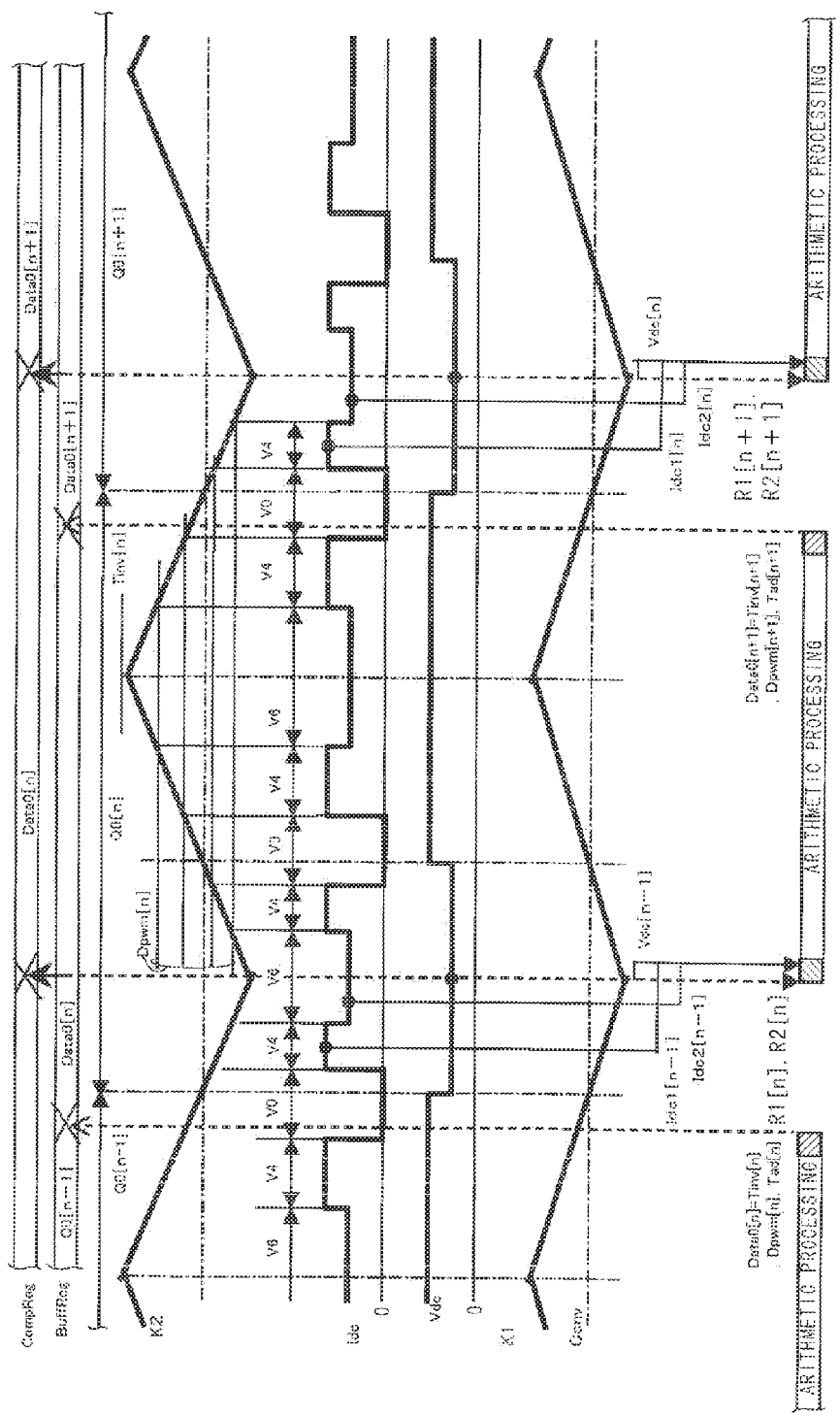
FIG. 6 is a timing chart showing operations of the converter control unit, the inverter control unit and the arithmetic processing unit.

FIG. 6 is a timing chart showing operations of the converter control unit 11, the inverter control unit 12 and the arithmetic processing unit 10 when the inverter carrier K2 uses a triangular wave having the same cycle as that of the converter carrier K1. Note that, here, an interrupt command R1[$k$] from the converter control unit 11 and the interrupt command R2[$k$] from the inverter control unit 12 occur at the same timing.

The inverter carrier K2 and the converter carrier K1 start in synchronization with each other, and the inverter threshold value Dpwm[$k$] is divided into two groups at the time when the converter carrier K1 takes the converter threshold value Ccnv, whereby PWM signals of the inverter 22 and the converter 21 are synchronized with each other.

As described above, the two-division control can be performed by a single-chip microcomputer instead of adopting a logic IC such as a CPLD and an FPGA.

Indeed, Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174/VT-12-025/HCA-12-059, IEE Japan 2012(20), pp. 31-36, 2012-12-06 talks about a possibility of application of a microcomputer to a direct power converter, and describes that a configuration is available by nine-phase voltage-source carrier comparison and general-purpose logic. In this mode, in order to realize PWM modulations by one triangular wave carrier, two sets of complementary PWM timers are applied, and general-purpose timers are used for three phases, then the synchronization of the PWM modulations can be realized by starting the carriers in synchronization with each other.

However, when the multi-phase AC current Iv has three phases, four to six inverter threshold values Dpwm[k] are required. The inverter switching signal Sinv covers a pair of switches, in which the inverter 22 operates complementarily, by the number of phases. Hence, in order to obtain the inverter switching signal Sinv, complementary PWM modulators designed in response to the number of phases (for example, for three phases) are required.

On the other hand, in a multi-function timer pulse unit, each of the units capable of functioning as complementary PWM modulators performs comparison between up to three threshold values and a carrier waveform. Hence, when the two-division control is performed, two units are occupied only by controlling the inverter 22.

In general, with regard to a multi-function timer pulse unit included in a single-chip microcomputer selected for consumer use, mostly, two sets of such units are provided. Hence, when there are a plurality of combinations of the inverter 22 and the load 3, for example, when a compressor motor and a fan motor are separately PWM-controlled as such loads 3 in an air conditioner, then there is a possibility that both of the motors cannot be controlled by the same single-chip microcomputer.

Accordingly, a description will be made below of operations in which the two-division control is performed for the inverter 22 only by the single complementary PWM modulator in this embodiment. Specifically, the control explained in FIG. 4 will be described in more detail.

(b-3) First Method of this Embodiment

Figure 7:
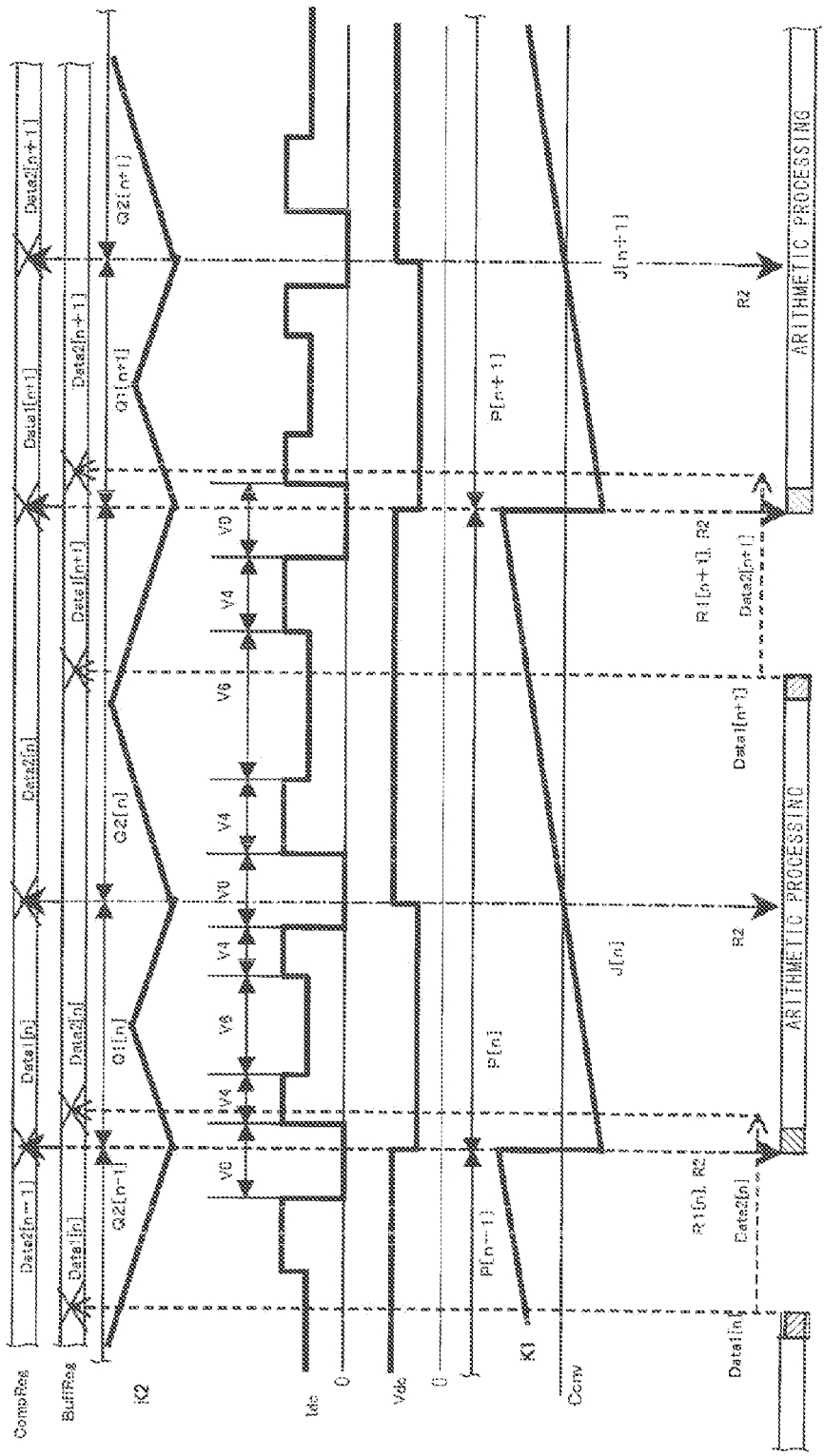
FIGS. 7 and 8 are timing charts showing operations of a first method of the first embodiment.
Figure 8:
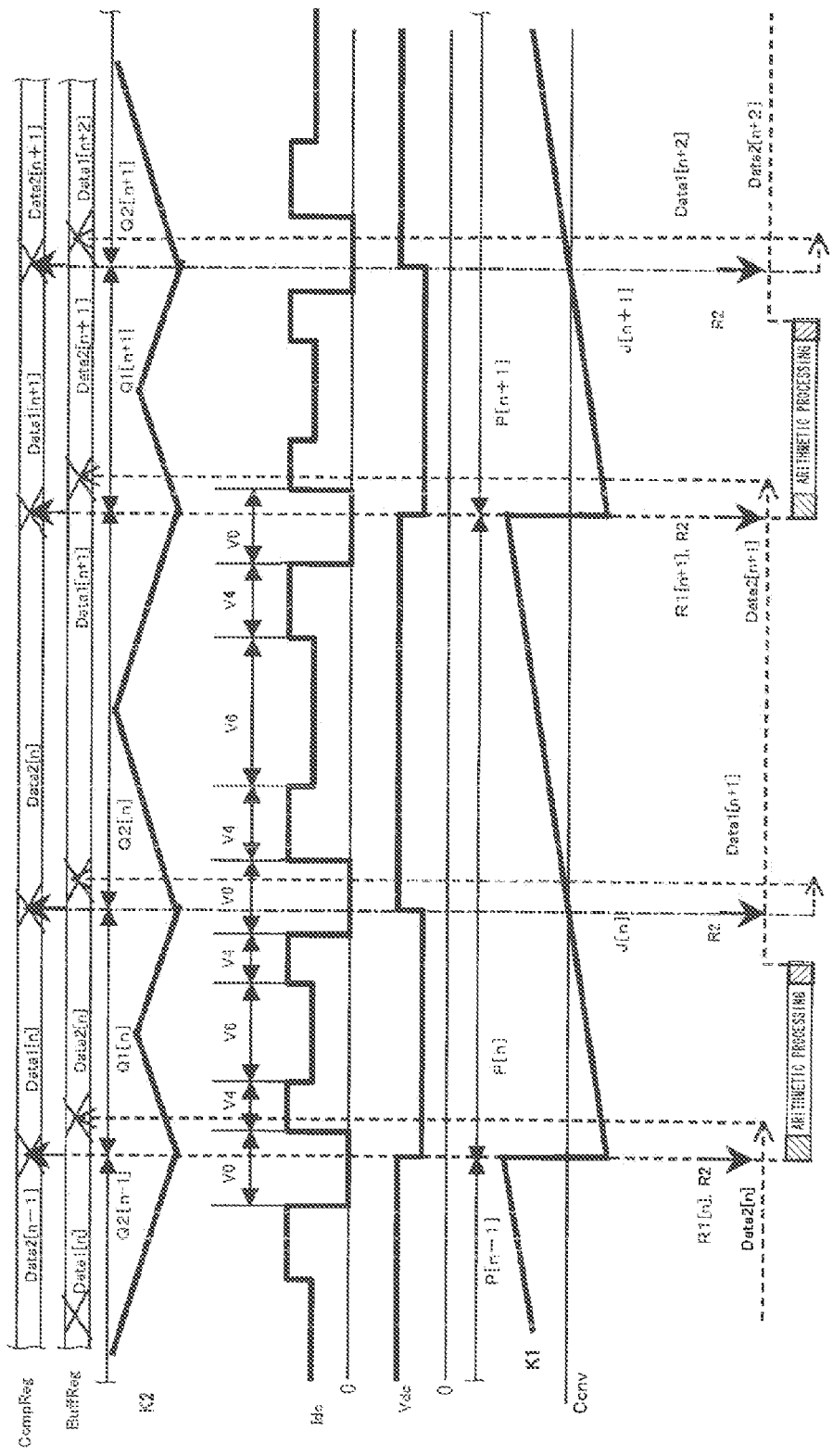

FIG. 7 and FIG. 8 are timing charts showing operations of a first method of this embodiment. In both Figs., the converter carrier K1 and the inverter carrier K2, which are shown in FIG. 4, are shown. However, in a similar way to (b-1) described above, the symbol [k] is appended to symbols indicating the variety of amounts in the k-th cycle.

However, in order to avoid complication, the appending of the symbol [k] is omitted for the interrupt command R2. As understood with reference to FIG. 2 and FIG. 4, the timing at which the interrupt command R2 occurs in this embodiment is the timing at which the timer 121 counts up (trough interrupt), which is the boundary point of time described with reference to FIG. 4.

Note that, among the boundary points of time, the matching point of time corresponding to the time t20 in FIG. 4, that is, the boundary point of time at which the converter carrier K1 takes the converter threshold value Ccnv is appended with a symbol J[k].

FIG. 7 illustrates a case where the arithmetic processing for obtaining the first data Data1 and the second data Data2 is longer than the period length of the second period Q1 (which corresponds to the second period length Tinv1 in FIG. 4), and FIG. 8 illustrates a case where the arithmetic processing is shorter than the period length of the second period Q1. However, it is not clear in advance whether the time taken for the arithmetic processing is longer or shorter than the second period Q1.

Accordingly, in order to cope with both cases, priority is given to the interrupt handling based on the interrupt commands R1 and R2. Specifically, the interrupt handling by the interrupt command R1 is treated as higher one (hereinafter, referred to as "higher interrupt handling"), and the interrupt handling by the interrupt command R2 is treated as lower one (hereinafter, referred to as "lower interrupt handling").

Figure 9:
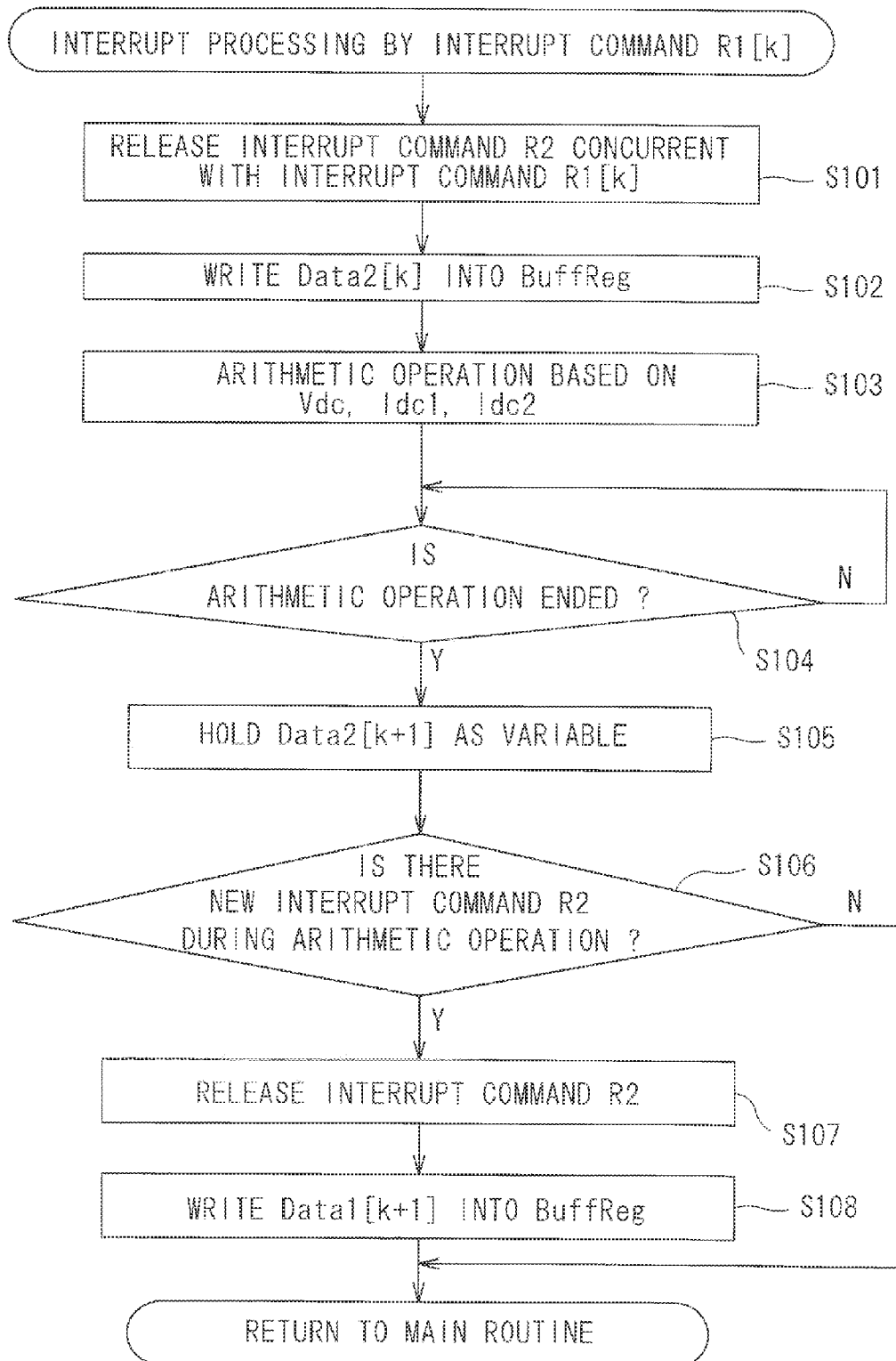
FIG. 9 is a flowchart showing operations of higher interrupt handling in the first method of the first embodiment.

FIG. 9 is a flowchart showing operations of the higher interrupt handling in the first method, and such operations are executed by the arithmetic processing unit 10. Note that the lower interrupt handling is writing of the first data Data1 into the buffer register BuffReg.

The fact that the lower interrupt handling is subordinated to the higher interrupt handling (the higher interrupt handling is processed preferentially to the lower interrupt handling) is based on the priority set in software. Moreover, the lower interrupt handling itself is executed by hardware in the single-chip microcomputer.

The converter carrier K1 and inverter carrier K2 are synchronized with each other, and the interrupt command R2 also occurs (corresponding to the time t10 in FIG. 4) concurrently with the timing when the interrupt command R1[k] occurs, and the transfer from the buffer register BuffReg to the compare register CompReg is also executed. For example, the first data Data1[n] and Data1[n+1] are transferred from the buffer register BuffReg to the compare register CompReg at the timing at which the interrupt commands R1[n] and R1[n+1] occur in FIG. 7 and FIG. 8, respectively.

In FIG. 9, when the interrupt handling by the interrupt command R1[k] (this processing is the higher interrupt handling) is started, firstly in Step S101, the interrupt command R2 that occurs concurrently with the interrupt command R1[k] is released. The occurrence point of time of the interrupt command R1[k] is a start point of the first period P[k] of the k-th cycle, and is also an end point of the first period P[k−1] of the (k−1)-th cycle.

Here, the release of the interrupt command R2 means that the interrupt command R2 is treated as absent. This is because, without such a release, the writing to the buffer register BuffReg is performed again by the lower interrupt handling after the higher interrupt handling including the writing to the buffer register BuffReg is ended. This point will be also mentioned later.

Thereafter, by Step S102, the second data Data2[k] is written into the buffer register BuffReg. However, this write is processing performed upon receipt of the interrupt command R1[k], and this write is performed after the transfer of the first data Data1[k] from the buffer register BuffReg to the compare register CompReg (this transfer is performed at the same timing as the occurrence of the interrupt command R1[k]). That is, the second data Data2[k] is written into the buffer register BuffReg after the first data Data1[k] stored therein is transferred to the compare register CompReg.

Then, in Step S103, by using the digital value Ddc obtained from the AD conversion unit 13, the arithmetic processing based on the DC voltage Vdc and the DC currents Idc1 and Idc2 is performed, and the first data Data1[k+1] and the second data Data2[k+1] are calculated. The first period P[k+1] is present immediately after the first period P[k]. The above-described arithmetic processing is performed every first period, and the first data Data1[k+1] and the second data Data2[k+1], which are obtained in the first period P[k], are adopted for the control for the inverter 22 in the pair of second periods Q1[k+1] and Q2[k+1] in the first period P[k+1].

The above-mentioned comparative example corresponds to the PWM control performed for the inverter 22 based on both of the first data Data1[k+1] and the second data Data2[k+1], and has required two complementary PWM operators.

Accordingly, in this embodiment, the timing of writing the first data Data1[k+1] into the buffer register BuffReg and the timing of writing the second data Data2[k+1] thereinto are shifted from each other, whereby pieces of timing at which these are transferred from the buffer register BuffReg to the compare register CompReg are shifted from each other, and thus, the number of complementary PWM operators required for the inverter control unit 12 is saved to be one. Specifically, the second data Data2[k+1] in the results of the above-described arithmetic processing is held as a variable by Steps S104 and S105.

Then, in Step S106, it is determined whether or not there is a new interrupt command R2 during the arithmetic processing for obtaining the first data Data1[k+1] and the second data Data2[k+1]. Here, "new" means "occurring after the interrupt command R2" released in Step S101.

It is possible to make such a determination by adopting a so-called interrupt flag for the interrupt command R2. Such an interrupt flag is set by the occurrence of the interrupt command R2, and is reset by the end of the lower interrupt handling or the operation by the higher interrupt handling.

Specifically, the release of the interrupt command R2 in Step S101 can be realized by resetting the interrupt flag set by the occurrence of the interrupt command R2. Hence, a determination result of Step S106 turns to a positive determination result or a negative determination result depending on whether the interrupt flag is set or reset, respectively.

The case where the determination result of Step S106 is negative, that is, the case where the interrupt command R2 is not present after the interrupt command R2 that occurs concurrently with the interrupt command R1[k] during the arithmetic processing in the first period P[k] is a case where the arithmetic processing is shorter than the period length of the second period Q1[k]. Hence, FIG. 8 corresponds to this case.

In this case, the higher interrupt handling is ended, and the processing of the arithmetic processing unit 10 returns to the main routine.

When the interrupt command R2 occurs firstly after the arithmetic processing in the first period P[k] is ended, as lower interruption processing by this, writing of the first data Data1[k+1] to the buffer register BuffReg is executed. However, since FIG. 9 is a flowchart for the higher interrupt handling, such lower interrupt handling is not shown.

There is a required time for writing the first data Data1[k+1] into the buffer register BuffReg by this lower interrupt handling. Specifically, there is a time required for branching from the main routine to the lower interrupt handling and writing to the buffer register BuffReg. Hence, the writing is delayed from the occurrence of the interrupt command R2. In FIG. 8, the lower interruption processing is drawn on a lower side of the figure than the higher processing executed in Step S102. Here, rightward arrows indicate that the writing of the first data Data1[k+1] into the buffer register BuffReg is performed later than the occurrence of the interrupt command R2.

Hence, after the transfer of the second data Data2[k] from the buffer register BuffReg to the compare register CompReg, the transfer being performed at the same timing as the occurrence of the interrupt command R2, the writing of the first data Data1[k+1] to the buffer register BuffReg is performed. In this way, after the second data Data2[k] to be compared with the inverter carrier K2 in the second period Q2[k] is stored in the compare register CompReg, the first data Data1[k+1] to be compared with the inverter carrier K2 in the second period Q1[k+1] is stored in the buffer register BuffReg.

Hence, even if the arithmetic processing by the higher processing is ended earlier than the start of the second period Q2[k], there can be avoided such a situation where the first data Data1[k+1] as a result of the arithmetic operation is compared with the inverter carrier K2 in the second period Q2[k].

The case where the determination result of Step S106 is positive, is a case where the arithmetic processing takes longer than the period length of the second period Q1[k]. Hence, FIG. 7 corresponds to this case. In this case, the interrupt command R2 is released (the interrupt flag is reset) by Step S107, and the first data Data1[k+1] is written into the buffer register BuffReg in the higher interrupt handling by Step S108.

A reason for executing Step S107 will be described. If the interrupt command R2 is not released by Step S107, then there remains the lower interrupt handling that is the writing the first data Data1[k+1] into the buffer register BuffReg, which is performed based on the interrupt command R2. If this is executed, then, after the first data Data1[k+1] is written into the buffer register BuffReg in Step S108, and the higher interrupt handling is ended, the first data Data1[k+1] is written into the buffer register BuffReg by the lower interrupt handling one more time, and the processing becomes redundant. Hence, Step S107 is executed.

Next, a reason for executing Step S101 will be described. If Step S101 is not executed, then the interrupt flag is set due to the interrupt command R2 occurring with the start of the higher interrupt handling. If this is left untreated, the determination of Step S106 is always positive. In such a situation, Steps S107 and S108 are executed even when there is no new interrupt command R2 during the arithmetic processing in the higher processing.

For example, in FIG. 8, the first data Data1[n+1] is written into the buffer register BuffReg before the timing at which the "new" interrupt command R2 occurs. Then, in the transfer from the buffer register BuffReg to the compare register CompReg, the transfer being performed at the subsequent matching point of time J[n], the first data Data1[n+1] is transferred though the second data Data2[n] adopted in the second period Q2[n] should be transferred. In this case, the inverter 22 cannot be appropriately operated in the second period Q2[n]. As mentioned above, it is not clear in advance whether the time taken for the arithmetic processing is longer or shorter than the second period Q1, and accordingly, Step S101 is executed to ensure the appropriate operation of the inverter 22 in the second period Q2[n].

As described above, in the first method, the first data Data1[k+1]
(a) on and after the end time of the arithmetic processing in the first period P[k] (refer to Step S108) when the boundary point of time is present after the start of the arithmetic processing and before the arithmetic processing is ended (when the boundary point of time is the matching point of time J[k], and the arithmetic processing is ended later than this: refer to FIG. 7),
(b) when the boundary point of time is not present (that is, when the arithmetic processing is ended earlier than the matching point of time J[k]: refer to FIG. 8), by the lower interrupt handling by the interrupt command R2 occurring at the first boundary point of time after the end of arithmetic processing, is stored in the buffer register BuffReg in such individual cases.

More specifically, in the first method, the first data Data1 [k+1]
(a1) is stored in the buffer register BuffReg at the time when the arithmetic processing in the first period P[k] is ended when the matching point of time J[k] is present after the start of the arithmetic processing and before the end of the arithmetic processing.

Then, by adopting the first method, among the data obtained by the arithmetic processing in the first period P[k], the first data Data1[k+1] is stored before the start of the first period P[k+1], and the second data Data2[k+1] is stored in the buffer register BuffReg on the occasion of the start of the first period P[k+1].

Hence, in the first period P[k], the first data Data1 and the second data Data2 are alternately given to the inverter control unit 12.

As mentioned above, contents stored in the buffer register BuffReg at the boundary point of time are transferred to the compare register CompReg. Then, the contents stored in the compare register CompReg, more specifically, the inverter threshold value Dpwm1 and the second period length Tinv1 (or the inverter threshold value Dpwm2 and the second period length Tinv2 and the sample timing signal Tad), and the inverter carrier K2 are compared with each other. Hence, the inverter carrier K2 and the contents stored in the compare register CompReg are appropriately compared with each other, and the two-division control can be realized by a single complementary PWM modulator.

Hence, synchronous PWM modulation can be realized by using a single complementary PWM timer and a general-purpose PWM timer, and the logic IC such as the CPLD and the FPGA is not required.

In addition, a control system with a constant control cycle can be configured easily without depending on a processing time required for the arithmetic processing.

(b-4) Second Method of this Embodiment

Figure 10:
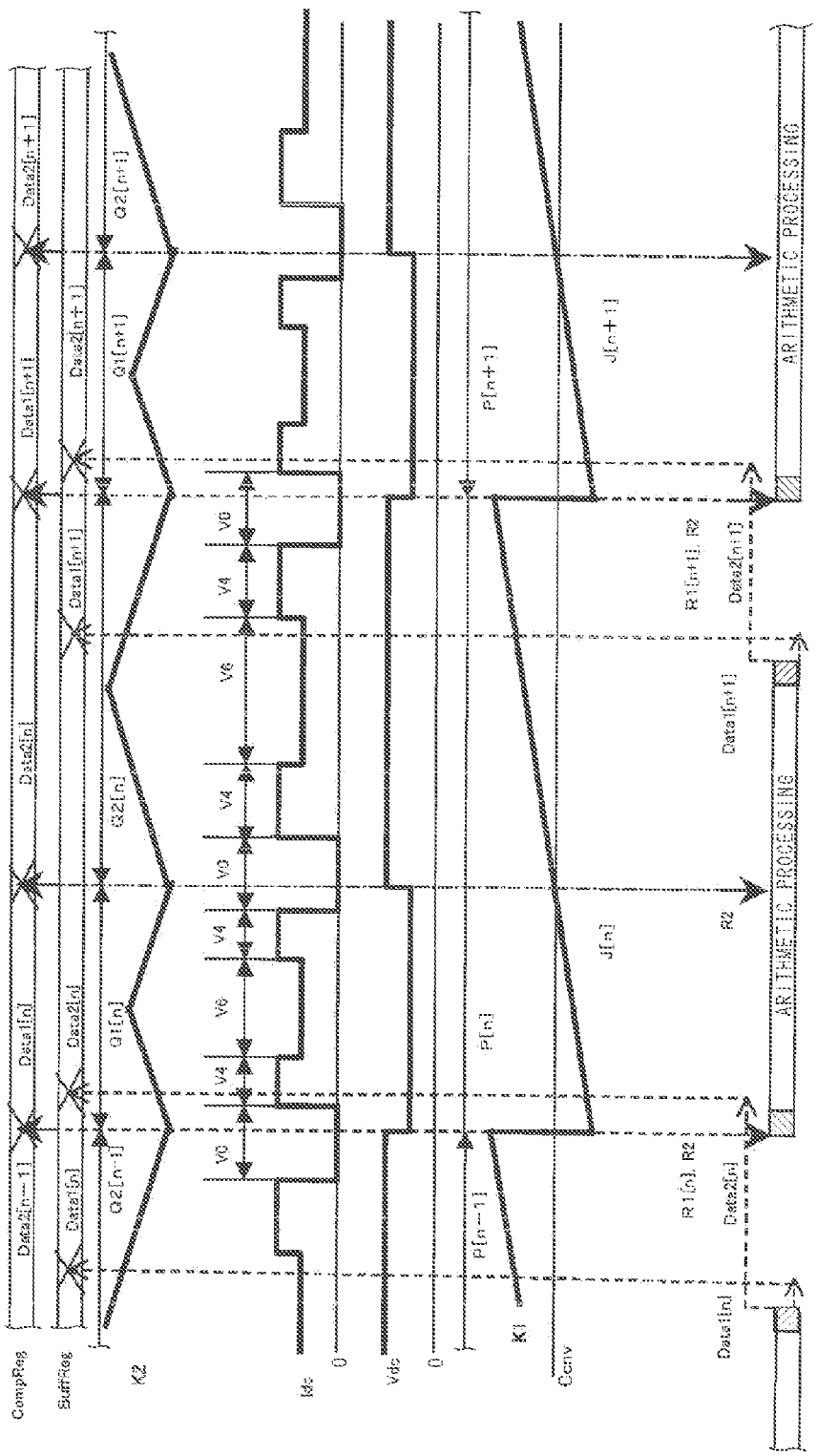
FIGS. 10 and 11 are timing charts showing operations of a second method of the first embodiment.
Figure 11:
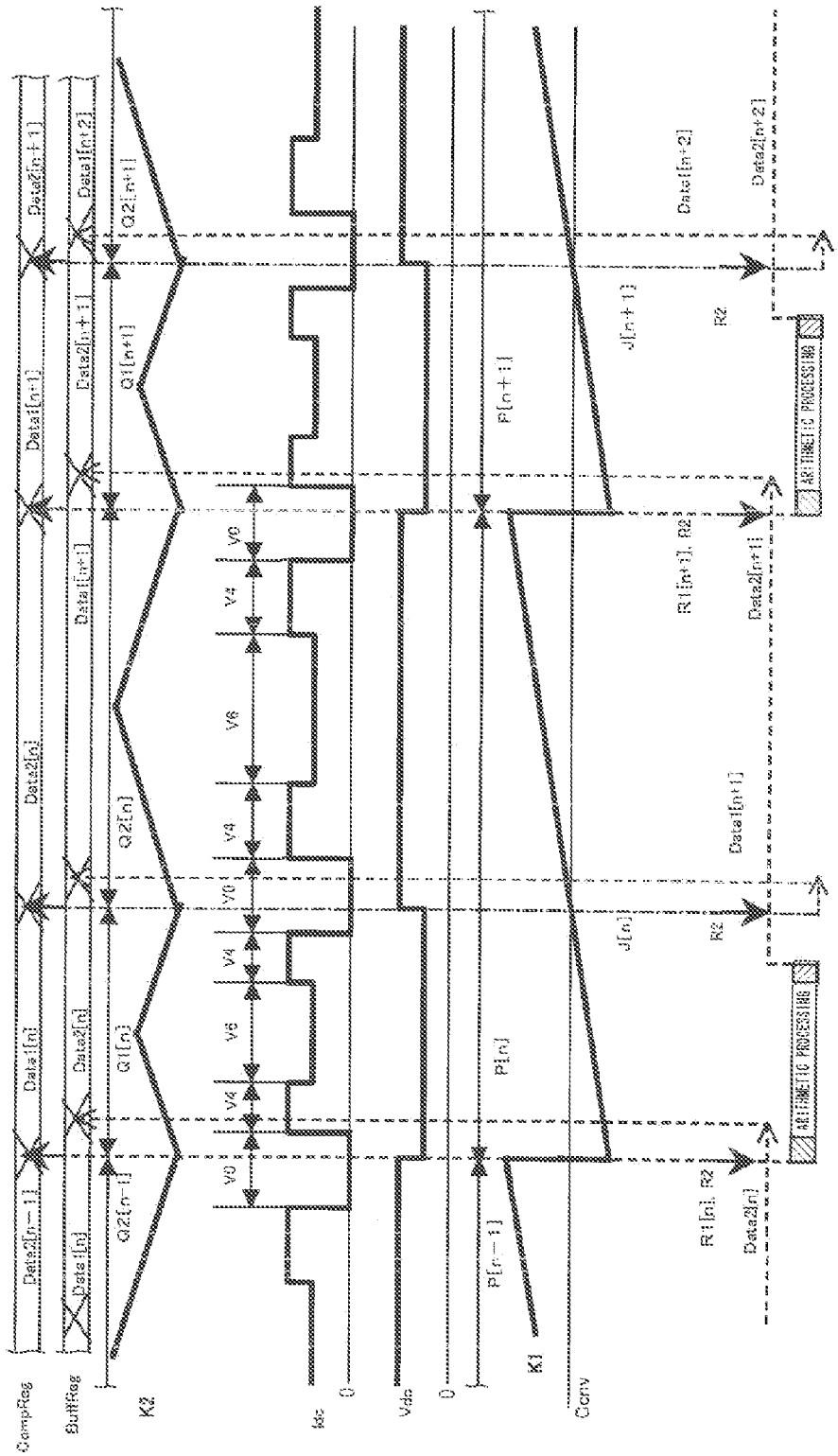

FIG. 10 and FIG. 11 are timing charts showing operations of a second method of this embodiment, in which the same symbols as in (b-3) described above are adopted.

FIG. 10 corresponds to FIG. 7, and illustrates a case where the arithmetic processing for obtaining the first data Data1 and the second data Data2 is longer than the period length of the second period Q1, and FIG. 11 corresponds to FIG. 8, and illustrates a case where the arithmetic processing for obtaining the first data Data1 and the second data Data2 is shorter than the period length of the second period Q1.

Figure 12:
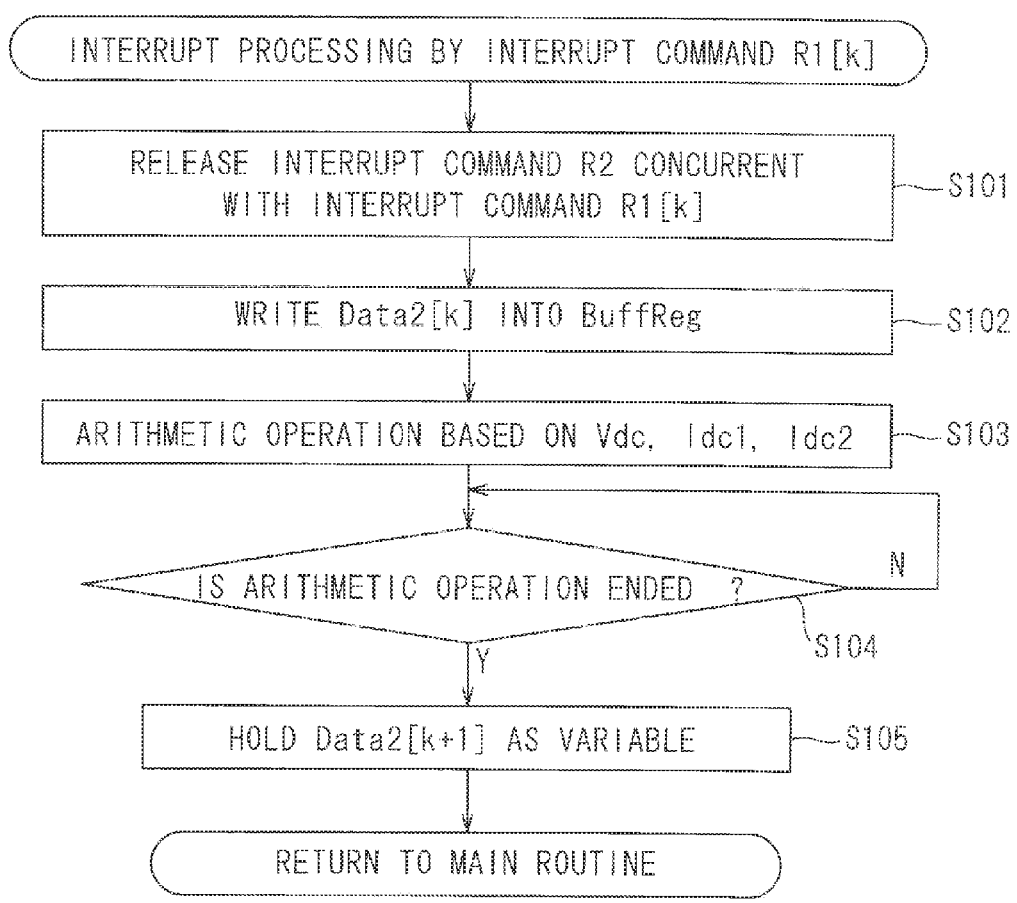
FIG. 12 is a flowchart showing operations of higher interrupt handling in the second method of the first embodiment.

FIG. 12 is a flowchart showing operations of the higher interrupt handling in the second method, and such operations are executed by the arithmetic processing unit 10. Note that the lower interrupt handling is writing of the first data Data1 into the buffer register BuffReg in a similar way to the first method.

The second method is represented by a flowchart in which Steps S106 to S108 in the first method are deleted. That is, after Steps S101 to S105 are ended, the higher interrupt handling is ended, and the processing of the arithmetic processing unit 10 returns to the main routine.

When a new interrupt command R2 occurs after the start of the arithmetic operation ("new" mentioned here means "occurring after the interrupt command R2" released in Step S101 in a similar way to "new" in the first method), the first data Data1 is written into the buffer register BuffReg as the lower interrupt handling performed thereby. Such writing is shown as the first data Data1[$n$+1] and Data1[$n$+2] in both of FIG. 10 and FIG. 11.

Regardless of whether or not the "new" interrupt command R2 occurs during the arithmetic processing of the higher interrupt handling, the higher interrupt handling is preferentially executed, and the lower interrupt handling by the interrupt command R2 is not executed. Hence, as shown in FIG. 11, even if the arithmetic processing in the first period P[k] is ended earlier than the matching point of time J[k], the first data Data1[$k$+1] is written into the buffer register BuffReg after timing of the matching point of time J[k] at which the "new" interrupt command R2 occurs. Hence, in a similar way to the first method, the appropriate operation of the inverter 22 in the second period Q2[$n$] is ensured.

Note that, unlike the first method, in the second method, the writing to the buffer register BuffReg (Step S108 of FIG. 9) is not performed in the higher interrupt handling. Hence, as in Step S107, such processing for avoiding the redundant writing is also unnecessary. In contrast, Step S101 is also executed in the second method for the same reason as explained in the first method.

Note that adoption of Step S108 in the first method is desirable from a viewpoint of shortening the time required for the interrupt handling. Specifically, in order to reduce a loss of the inverter 22 when the load is very light, it is desirable to adopt not the two-division control but control for controlling the inverter 22 in one cycle of the converter 21 (here, this control is tentatively referred to as "non-division control"). Then, if the non-division control and the two-division control are used in combination with each other, when non-division control is performed, the lower interrupt handling does not occur, and shortening the time required for the interrupt handling is achieved.

Moreover, as shown in FIG. 10, the timing at which the first data Data1[$k$+1] is written into the buffer register BuffReg is shifted behind similar timing shown in FIG. 7.

As described above, also in the second method, the first data Data1[$k$+1] is stored in the buffer register BuffReg in accordance with the above-described (a) and (b).

More specifically, in the second method, the first data Data1[$k$+1]
(a2) when the boundary point of time as the matching point of time J[k] is present after the start of the arithmetic processing and before the end of the arithmetic processing, is stored in the buffer register BuffReg by the lower interrupt handling by the interrupt command R2 occurring at the first boundary point of time after the end of the arithmetic processing.

And, by adopting the second method, in a similar way to the first method, the first data Data1[$k$+1] is stored in the buffer register BuffReg before the start of the first period P[k+1], and the second data Data2[$k$+1] is stored in the buffer register BuffReg on the occasion of the start of the first period P[k+1].

Hence, in the first period P[k], the first data Data1 and the second data Data2 are alternately given to the inverter control unit 12. Hence, in a similar way to the first method, the two-division control can be realized by the single complementary PWM modulator.

Note that, in both of the first method and the second method, the time required for the lower interrupt handling performed by the interrupt command R2 occurring at the matching point of time J[k] must be shorter than the period length of the second period Q2[$k$+1]. Otherwise, the lower interrupt handling will not catch in time the transfer from the buffer register BuffReg to the compare register CompReg, the transfer being performed at the point of time when the interrupt command R1[$k$+1] occurs.

In other words, the period length of the second period Q2[$k$+1] cannot be set to less than the time required for the lower interrupt handling. However, this required time is shorter than a dead time in the switching of the inverter 22 (the dead time is usually on the order of several microseconds). Then, the period length of the second period Q2[$k$+1] is not shortened to the dead time or less. This is because the second period Q2[$k$+1] of such a period length does not affect the multi-phase AC current Iv outputted by the inverter 22.

Since there is such a relationship with regard to the length of time, there is no practical significance of setting the period length of the second period Q2[$k$+1] to the required time for the lower interrupt handling or less. That is, a minimum value of the period length of the second period Q2[$k$+1] just needs to be limited to the required time or more.

Second Embodiment

Figure 13:
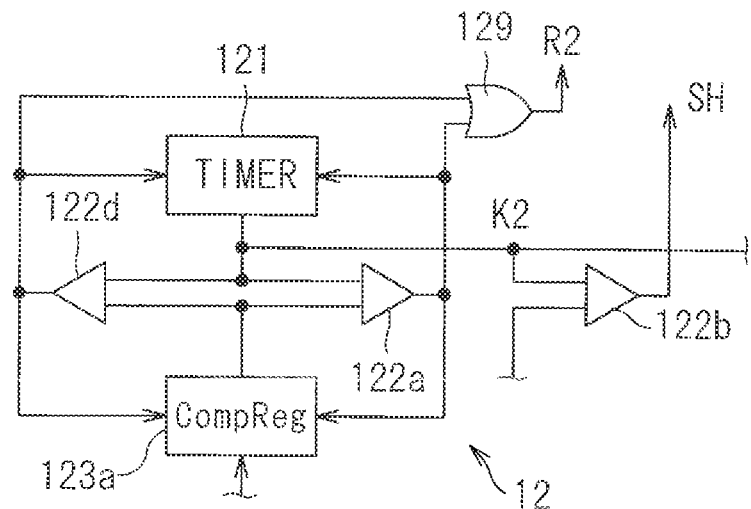
FIG. 13 is a block diagram illustrating a part of a configuration of an inverter control unit in a second embodiment

FIG. 13 is a block diagram illustrating a part of a configuration of an inverter control unit 12 in this embodiment. This configuration is different from the configuration of the inverter control unit 12 in the first embodiment in that the value inputted to the comparator 122d is caused to differ, and that not only the activation of the output of the comparator 122d but also activation of the comparator 122a is used as a trigger for the transfer from the buffer register BuffReg to the compare register CompReg. Moreover, an OR gate 129 is also added.

That is, the comparator 122d compares the count value of the timer 121 with the value (which is not a fixed minimum value as in the first embodiment) stored in the compare register 123a, and causes the timer 121 to count up when both of them match with each other. On the other hand, in a similar way to the first embodiment, the comparator 122a compares the count value of the timer 121 with the value stored in the compare register 123a, and causes the timer 121 to count down when both of them match with each other.

Then, the OR gate 129 causes the interrupt command R2 to occur when either one of the comparators 122a and 122d is activated. That is, in this embodiment, the interrupt command R2 is both a crest interrupt and a trough interrupt.

However, the OR gate 129 is shown for convenience of explanation in the figure, and it is not necessary to provide the OR gate 129 as an actual constituent.

Moreover, the comparator 122d can be integrated with the comparator 122a, and an output thereof can be used as the interrupt command R2 and a transfer command for transfer from the buffer registers 124a, 124b and 124c to the compare registers 123a, 123b and 123c. The timer 121 in this case has a function to alternately count up/count down every time when the output of the integrated comparator 122a is activated.

Figure 14:
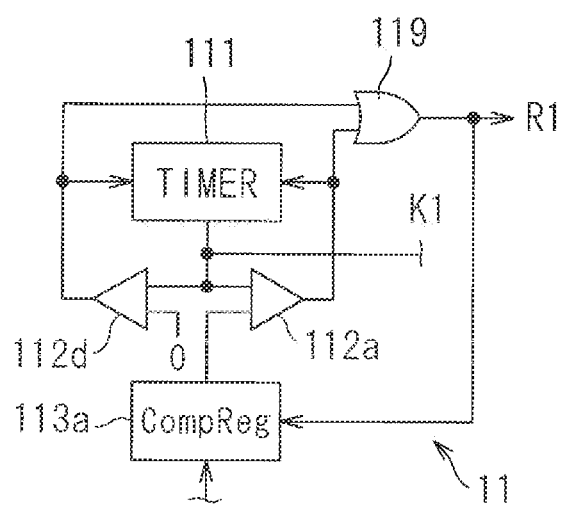
FIG. 14 is a block diagram illustrating a part of a configuration of a converter control unit in the second embodiment.

FIG. 14 is a block diagram illustrating a part of a configuration of a converter control unit 11 in this embodiment. This configuration is different from the configuration of the converter control unit 11 in the first embodiment only in that an OR gate 119 and a comparator 112d are added thereto, and that the timer 111 is caused to function as an up/down counter.

That is, the comparator 112d compares the count value of the timer 111 with a fixed minimum value (for example, 0), and causes the timer 121 to count up when both of them match with each other. On the other hand, in a similar way to the first embodiment, the comparator 112a compares the count value of the timer 111 with the value (first period length Tcnv) stored in the compare register 113a, and causes the timer 111 to count down when both of them match with each other.

The OR gate 119 causes the interrupt command R1 to occur when either one of the comparators 112a and 112d is activated. That is, in this embodiment, the interrupt command R1 can be said to be both a crest interrupt and a trough interrupt when the interrupt command R1 is expressed in a similar way to the expression used for the interrupt command R2.

Note that the OR gate 119 is shown for convenience of explanation in the figure, and it is not necessary to provide the OR gate 119 as an actual constituent.

Note that the transfer timing from the buffer registers 114a and 114c to the compare registers 113a and 113c is the same as the occurrence of the interrupt command R1 in a similar way to the first embodiment. However, unlike the first embodiment, the output of the comparator 112a does not directly function as the interrupt command R1. Here, the case where the interrupt command R1 is adopted as the transfer command for transfer from the buffer registers 114a and 114c to the compare registers 113a and 113c is illustrated.

The converter control unit 11 and the inverter control unit 12, which are as described above, can be realized by a known configuration commonly called the multi-function timer pulse unit in a similar way to those in the first embodiment.

With the above-described configuration, the interrupt command R1 becomes the trough interrupt and the crest interrupt, which are based on the converter carrier K1, and the interrupt command R2 becomes the trough interrupt and the crest interrupt, which are based on the inverter carrier K2.

Figure 15:
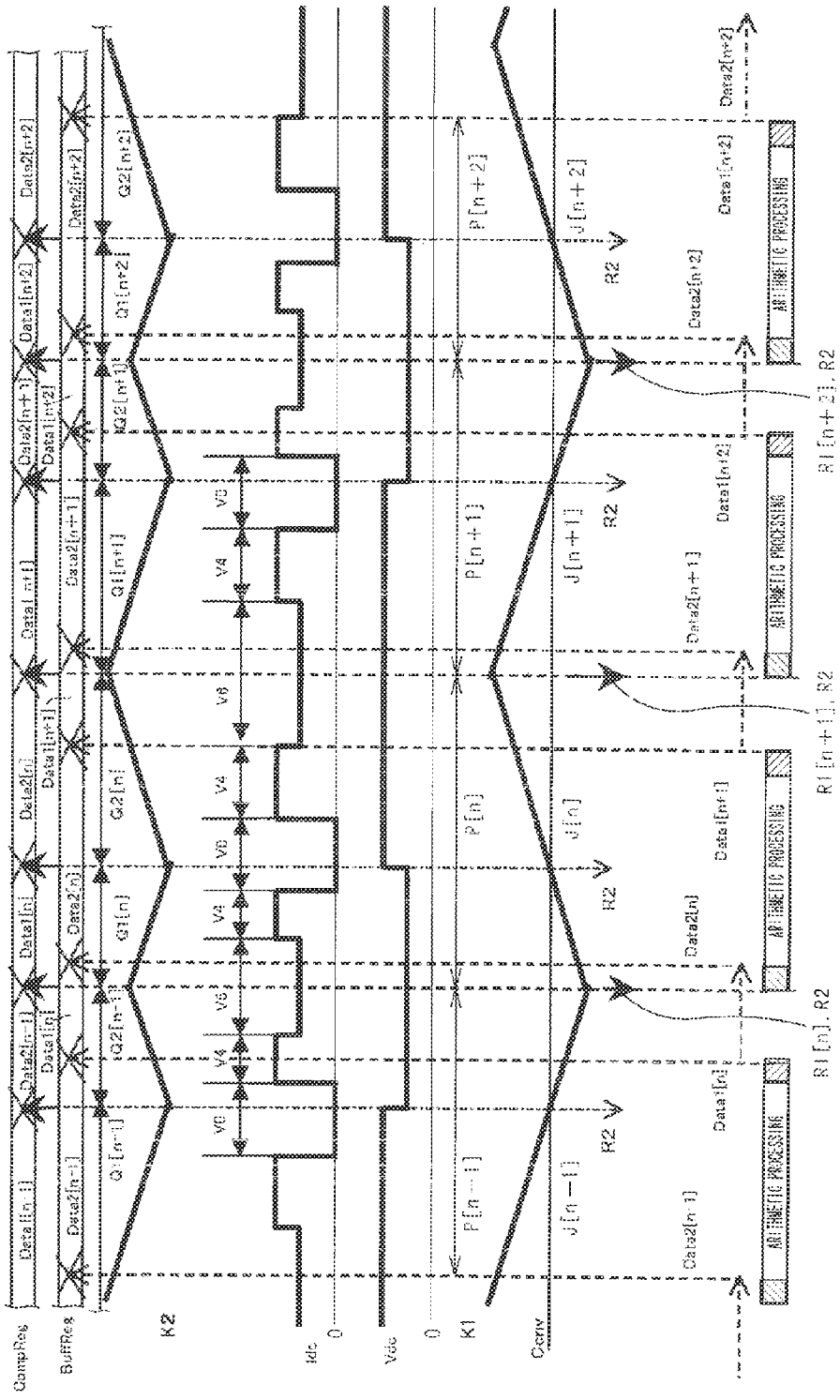
FIG. 15 is a timing chart showing operations in the second embodiment.

FIG. 15 is a timing chart showing operations in this embodiment. Also in FIG. 15, in a similar way to FIGS. 7 and 8, the symbol [k] is appended to symbols indicating the variety of amounts in the k-th cycle.

Here, for the sake of simplicity, a description will be made while taking as an example the case where the arithmetic processing in the first period P[k], which is for obtaining the first data Data1[k+1] and the second data Data2[k+1], is longer than the second period Q1[k], and is naturally shorter than the first period P[k]. However, considering that the arithmetic processing in the first period P[k] may be shorter than the second period Q1[k], it is desirable that either of the first method and the second method, which are described in the first embodiment, be adopted.

Also in this embodiment, the timers 111 and 121 operate in synchronization with each other, and the converter carrier K1 and the inverter carrier K2 are synchronized with each other.

Since the timer 111 functions as the up/down counter, the converter carrier K1 apparently exhibits not a sawtooth wave but a triangular wave.

In FIG. 15, the second data Data2[n], which is already obtained in the first period P[n−1] and held as a variable by the interrupt command R1[n] serving as the trough interrupt for the converter carrier K1, is written into the buffer register BuffReg. However, before this writing, the first data Data1[n] is transferred from the buffer register BuffReg to the compare register CompReg at the same timing as the occurrence of the interrupt command R1[n]. In this way, from the beginning of the second period Q1[n], a variety of amounts (not shown) included in the first data Data1[n] are compared with the inverter carrier K2 in the second period Q1[n].

At the same timing as the occurrence of the interrupt command R1[n], the converter carrier K1 starts to rise, and the first period P[n] starts.

A second period length Tinv1[n] (not shown) included in the first data Data1[n] defines a minimum value of the inverter carrier K2. Since the inverter carrier K2 falls in the second period Q1[n], end timing of the second period Q1[n] is determined by the second period length Tinv1[n]. For the second period length Tinv1[n], a value corresponding to a time until the converter carrier K1 reaches the converter threshold value Ccnv from a minimum value (for example, 0) is set, and at the matching point of time J[n], the inverter carrier K2 starts rising.

The second period Q2[n] starts from the matching point of time J[n]. The second data Data2[n] is transferred from the buffer register BuffReg to the compare register CompReg at the matching point of time J[n], and accordingly, from the beginning of the second period Q2[n], a variety of amounts (not shown) included in the second data Data2[n] are compared with the inverter carrier K2 in the second period Q2[n].

A second period length Tinv2[n] (not shown) included in the second data Data2[n] defines a maximum value of the inverter carrier K2. Since the inverter carrier K2 rises in the second period Q2[n], end timing of the second period Q2[n] is determined by the second period length Tinv2[n].

For the second period length Tinv2[n], a value corresponding to the time until the converter carrier K1 reaches the maximum value (this corresponds to the first period length Tcnv) from the converter threshold value Ccnv is set, and end timing of the second period Q2[n] matches with the point of time when the converter carrier K1 reaches the maximum value. At this point of time, the converter carrier K1 starts to fall, the first period P[n] ends, and the first period P[n+1] starts.

As described above, the first period P[n] is divided into two by the second periods Q1[n] and Q2[n]. In a similar way to the first period P[n], the first period P[n+1] is also divided into two by the second periods Q1[n+1] and Q2[n+1]. As described above, it becomes possible to perform the two-division control also in this embodiment.

Unlike the first embodiment, the converter carrier K1 rises in the first period P[n], and falls in the first period P[n+1]. Then, it can be understood that, in each of the second periods Q1[k] and Q2[k], which divide the single first period P[k] into two, the inverter carrier K2 is not a triangular wave but a single sawtooth wave. That is, the converter carrier K1 alternately repeats a monotonic increase and a monotonic decrease every first period P[k], and the inverter carrier K2 alternately repeats a monotonic increase and a monotonic decrease every second periods Q1[k] and Q2[k].

Then, the second data Data2[k] to be compared with the inverter carrier K2 in the second period Q2[k] is stored in the buffer register BuffReg at the beginning of the immediately preceding second period Q1[k], and is transferred to the compare register CompReg at the beginning of the second period Q2[k]. Hence, obtaining the inverter switching signal Sinv in the second period Q2[k] is appropriately achieved.

In a similar way, the first data Data1[k+1] to be compared with the inverter carrier K2 in the second period Q1[k+1] is stored in the buffer register BuffReg by the end of the immediately preceding second period Q2[k], and is transferred to the compare register CompReg at the beginning of the second period Q1[k+1]. Hence, obtaining the inverter switching signal Sinv in the second period Q1[k+1] is appropriately achieved.

As described above, in a similar way to the first embodiment, also in this embodiment, the contents stored in the buffer register BuffReg at the boundary point of time are transferred to the compare register CompReg. Then, the contents stored in the compare register CompReg, more specifically, the inverter threshold value Dpwm1 and the second period length Tinv1 (or the inverter threshold value Dpwm2 and the second period length Tinv2 and the sample timing signal Tad), and the inverter carrier K2 are compared with each other. Hence, realizing the two-division control by the single complementary PWM modulator is achieved.

In comparison with the first embodiment, in this embodiment, if the time required for the higher arithmetic processing is short, the number of times of this processing can be doubled. Hence, the number of times that the inverter switching signal Sinv is updated can be doubled, and responsiveness of the multi-phase AC current Iv is improved.

Third Embodiment

In this embodiment, for the configuration of the converter control unit 11, the configuration (FIG. 3) adopted in the first embodiment is adopted, and for the configuration of the inverter control unit 12, the configuration (illustrated in FIG. 13) adopted in the second embodiment is adopted.

In this way, the converter carrier K1 exhibits a sawtooth wave having the first period length Tcnv as a cycle, and the inverter carrier K2 alternately repeats a monotonic increase and a monotonic decrease every second periods Q1[k] and Q2[k].

Figure 16:
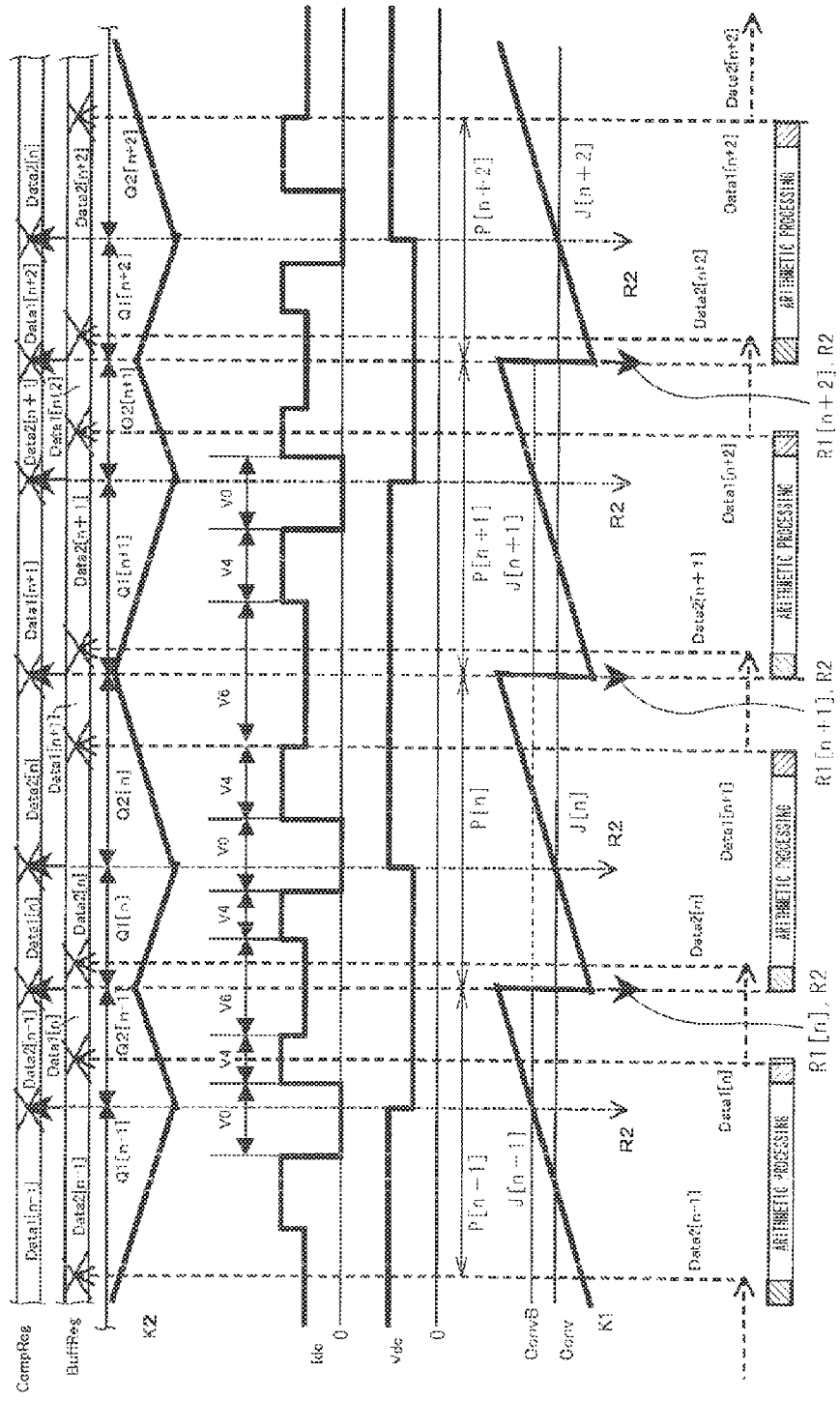
FIG. 16 is a timing chart showing operations in a third embodiment.

FIG. 16 is a timing chart showing operations in this embodiment. Also in FIG. 16, in a similar way to FIGS. 7 and 8, the symbol [k] is appended to symbols indicating the variety of amounts in the k-th cycle.

In a similar way to the second embodiment, also in this embodiment, for the sake of simplicity, a description will be made while taking as an example the case where the arithmetic processing in the first period P[k], which is for obtaining the first data Data1[k+1] and the second data Data2[k+1], is longer than the second period Q1[k], and is naturally shorter than the first period P[k]. However, considering that the arithmetic processing in the first period P[k] may be shorter than the second period Q1[k], it is desirable that either of the first method and the second method, which are described in the first embodiment, be adopted in a similar way to the second embodiment.

Also in this embodiment, the timers 111 and 121 operate in synchronization with each other, and the converter carrier K1 and the inverter carrier K2 are synchronized with each other.

In FIG. 16, in the first periods P[n−1] and P[n+1], the converter carrier K1 rises unlike FIG. 15 shown in the second embodiment. On the other hand, a waveform of the inverter carrier K2 is similar to that of the second embodiment, and second periods, which belong to different first periods and are adjacent to each other, for example, the second periods Q2[n−1] and Q1[n] become line symmetric on time axis with respect to, as an axis, the boundary point of time between both of them. The second periods Q2[n] and Q1[n+1] also have similar symmetry.

In the second embodiment, such symmetry has been maintained by the fact that the converter carrier K1 is an apparently symmetric triangular wave. Accordingly, in order to obtain such symmetry also in this embodiment, a converter threshold value CcnvB is adopted in addition to the converter threshold value Ccnv.

Specifically, such a value is obtained as CcnvB=1-Ccnv when a maximum value of the converter carrier K1 is set to 1 (for example, this is realized by setting the first period length as Tcnv=1), and a minimum value thereof is set to 0 (for example, this is realized by setting, to 0, the count value of the timer 111 when the timer 111 is reset by the comparator 112a). Such a calculation is performed, for example, by the arithmetic processing unit 10. Then, the converter threshold values CcnvB and Ccnv just need to be alternately inputted to the buffer register 114c (refer to FIG. 3).

As described above, in a similar way to the second embodiment, the contents stored in the buffer register BuffReg at the boundary point of time are transferred to the compare register CompReg. Then, the contents stored in the compare register CompReg, more specifically, the inverter threshold value Dpwm1 and the second period length Tinv1 (or the inverter threshold value Dpwm2 and the second period length Tinv2 and the sample timing signal Tad), and the inverter carrier K2 are compared with each other. Hence, realizing the two-division control by the single complementary PWM modulator is achieved.

In addition, it is sufficient if the timer 111 has a general function that is an up counter, and accordingly, a range of options for selecting the general-purpose PWM timer adopted for implementing this embodiment is widened. This is advantageous in that resources of the single-chip microcomputer adopted in this embodiment can be effectively used.

Fourth Embodiment

In a fourth embodiment, a description will be made of the case where the converter 21 converts a three-phase AC voltage into the DC voltage Vdc.

FIG. 17 is a block diagram illustrating a configuration of a power converter 2 adopted in this embodiment. In the power converter 2, a current source converter is adopted as the converter 21, and a voltage source inverter is adopted as the inverter 22. Such configuration itself is known in Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174/VT-12-025/HCA-12-059, IEE Japan 2012(20), pp. 31-36, 2012-12-06.

The converter 21 and the inverter 22 are connected to each other by DC power supply lines LH and LL. The DC power supply line LH is at a higher potential than the DC power supply line LL by the DC voltages Vdc.

Between the DC power supply lines LH and LL, a clamp circuit, to which a nonlinear capacitor as illustrated in Renesas Electronics Application Note: RX62T Group— Usage Example of 12-Bit AD Converter in One Shunt Current Detection Method, R01AN0821JJ0100 is applied, may be provided. In the non-division control, a switch connected in series to the capacitor in the clamp circuit is made conductive.

The converter 21 has input ends Pr, Ps and Pt, which are connected to a three-phase AC power supply 83, and receive three-phase AC voltages Vr, Vs and Vt for each phase. The three-phase AC power supply 83 can be understood as an example of the AC power supply 8 of FIG. 1.

The converter 21 commutates line currents Ir, Is and It, which are supplied from the input ends Pr, Ps and Pt in a cycle divided into a first section and a second section, and inputs the DC current Idc between the DC power supply lines LH and LL.

The first section is a period while a current flowing through a pair in the input ends Pr, Ps and Pt, the pair applied an AC voltage exhibiting a maximum phase and an AC voltage exhibiting a minimum phase, is supplied as the DC current Idc between the DC power supply lines LH and LL.

The second section is a period while a current flowing through a pair in the input ends Pr, Ps and Pt, the pair applied an AC voltage exhibiting an intermediate phase and the AC voltage exhibiting the minimum phase, is supplied as the DC current Idc between the DC power supply lines LH and LL.

The converter 21 includes switches Qxp and Qxn (where x represents r, s and t, the same applies hereinafter). Each of the switches Qxp is provided between the input end Px and the DC power supply line LH. Each of the switches Qxn is provided between the input end Px and the DC power supply line LL.

Both of the switches Qxp and Qxn have a reverse blocking capability, and these are illustrated as RB-IGBTs (Reverse Blocking IGBTs) in FIG. 17.

Switching signals Sxp and Sxn are inputted to the switches Qxp and Qxn, respectively. Each of the switches Qxp is made conductive/nonconductive in response to active/non-active of the switching signal Sxp, and each of the switches Qxn is made conductive/nonconductive in response to active/non-active of the switching signal Sxn. Hence, the switching signals Sxp and Sxn compose the converter switching signal Scnv.

The inverter 22 has connecting points Pu, Pv and Pw. The inverter 22 performs switching the DC voltage Vdc by a switching pattern that is based on the pulse width modulation, and outputs the (three-phase) multi-phase AC current Iv from the connecting points Pu, Pv and Pw.

The inverter 22 includes three current paths connected in parallel to one another between the DC power supply lines LH and LL to which the DC voltage Vdc is applied.

The inverter 22 includes switches Qyp and Qyn (where y represents u, v and w, the same applies hereinafter). The current paths include connecting point Py, upper arm-side switch Qyp, and lower arm-side switches Qyn. Diodes Dyp and Dyn are connected in antiparallel to the switches Qyp and Qyn, respectively. Here, "antiparallel" indicates that two elements are connected in parallel to each other, and that conduction directions of the two elements are opposite to each other.

Switching signals Syp and Syn are inputted to the switches Qyp and Qyn, respectively. Each of the switches Qyp is made conductive/nonconductive in response to active/non-active of the switching signal Syp, and each of the switches Qyn is made conductive/nonconductive in response to active/non-active of the switching signal Syn. Hence, the switching signals Syp and Syn compose the converter switching signal Scnv.

Such operations themselves of the converter 21 and the inverter 22, which are based on the switching signals Sxp, Sxn, Syp and Syn, are known, for example, by Japanese Patent No. 4135026, Wei, L., Lipo, T. A., Chan, H, "Matrix Converter Topologies With Reduced Number of Switches," PESC 2002, Jun. 23-27, 2002, vol. 1, pp 57-63, L. Wei, T. A. Lipo, "Investigation of 9-switch Dual-bridge Matrix Converter Operating under Low Output Power Factor," IEEE IAS2003, vol. 1, pp. 176-181 and Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174NT-12-025/HCA-12-059, IEE Japan 2012(20), pp. 31-36, 2012 Dec. 6, and accordingly, a detailed description thereof will be omitted. However, a brief description will be made of portions serving as the premise of the description of this embodiment.

Now, it is assumed that the voltage Vt is the minimum phase, and the voltages Vr and Vs become the maximum phase and the intermediate phase, respectively. Due to symmetry of a phase voltage waveform, such assumption does not lose generality by exchanging a phase sequence and by exchanging phases of the switches Qxp and Qxn.

Then, when such an assumption is made, both of line-to-line voltages (Vr-Vt) and (Vs-Vt) are positive, and these are selectively outputted as the DC voltage Vdc. Such a selective output is realized in such a manner that there are selected: a first state in which the switches Qrp and Qtn are turned on and the switches Qrn and Qtp are turned off; and a second state in which the switches Qtn and Qrp are turned on and the switches Qtp and Qsn are turned off. A period while the first state is maintained is the first section mentioned above, and a period while the second state is maintained is the second section mentioned above. Then, switching between the first state and the second state is understood as commutation of the converter 21, which accompanies the exchange of the maximum phase, the intermediate phase and the minimum phase among the voltages Vr, Vs and Vt.

Figure 18:
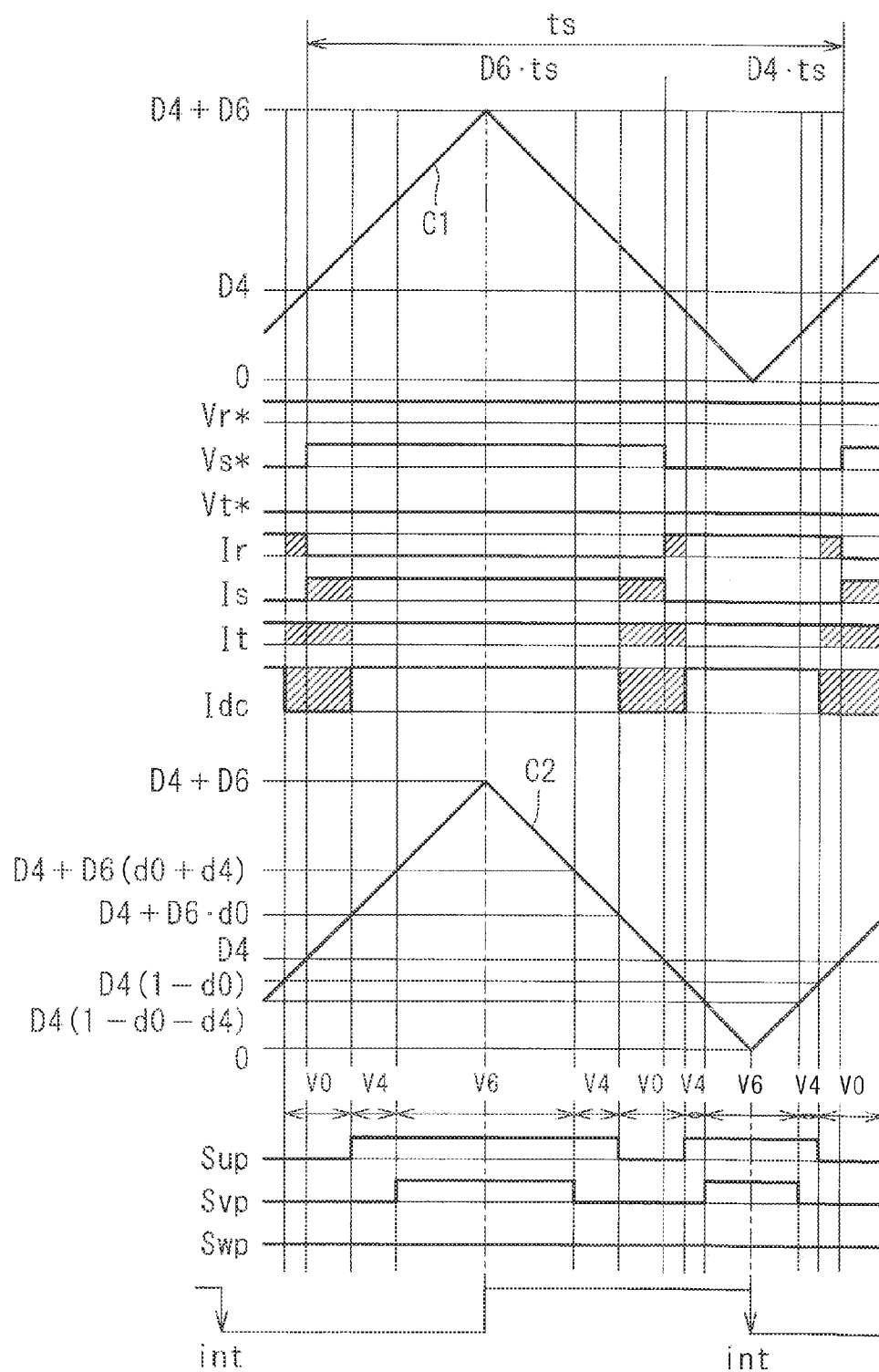
FIG. 18 is a graph showing operations of a power converter when compared with the fourth embodiment.

FIG. 18 is a graph showing operations of the power converter 2 when the technology known from Japanese Patent No. 4135026 and Fujita, Sakakibara, Matsuno, "Application and Development of the Three Phase Indirect Matrix Converter for Air Conditioners", The papers of Joint Technical Meeting on Semiconductor Power Converter/Vehicle Technology/Home and Consumer Appliances, SPC-12-174/VT-12-025/HCA-12-059, IEE Japan 2012(20), pp. 31-36, 2012-12-06 is adopted, and is shown for comparison with this embodiment. Timing of the commutation of the converter 21 can be determined by a symmetric triangular wave C1 and flow ratios D6 and D4 (=1−D6). When a cycle of the symmetric triangular wave is ts, a maximum value thereof is 1, and a minimum value thereof is 0, then the first section is present continuously in a length D6·ts, and the second section is present continuously in a length D4·ts.

Voltage-source trapezoidal waves are for signal waves Vr*, Vs* and Vt*, whereby the commutation of the converter 21 is performed on the basis of two voltage vectors. Hence, the converter 21 commutates at a point in time when the symmetric triangular wave C1 becomes equal to one of the flow ratios, for example, the flow ratio D4. As shown in Japanese Patent No. 4135026, such commutation of the converter 21, is realized by the switching pattern of the converter 21, which is obtained by performing current-source gate conversion.

A desirable way of selecting the flow ratios D4 and D6 is known, and accordingly, is omitted here. However, the first period length Tcnv, the converter carrier K1, and the converter threshold value Ccnv, which are described in the above-described "(b-2) Operation explanation of comparative example", correspond to the cycle ts, the symmetric triangular wave C1, and the flow ratio D4, respectively (refer to FIG. 6).

In FIG. 18, a symmetric triangular wave C2 takes the minimum value 0 and the maximum value 1. The symmetric triangular wave C2 is compared with voltage command values D4(1−d0−d4), D4(1−d0), D4+D6·d0 and D4+D6 (d0+d4). The values d0, d4 and d6 are signal waves for the operations of the inverter 22, and indicate ratios of periods while voltage vectors V0, V4 and V6 are adopted in the symmetric triangular wave C1, respectively. Here, there is illustrated a case where d0+d4+d6=1 is established, and where so-called two-phase modulation is adopted.

The inverter carrier K2 and the inverter threshold values Dpwm, which are described in the above-described "(b-2) Operation explanation of comparative example", correspond to the symmetric triangular wave C2 and the voltage command values, respectively (refer to FIG. 6). When two-phase modulation is not adopted, voltage command values D4(1−d0−d4−d6) and D4+D6(d0+d4+d6) are further adopted as objects to be compared with the symmetric triangular wave C2.

With respect to the flow ratio D4, the voltage command values D4(1−d0) and D4+D6·d0 are smaller by the value D4·d0 and larger by the value D6·d0, respectively. Moreover, with respect to the flow ratio D4, the voltage command values D4(1−d0−d4) and D4+D6(d0+d4) are smaller by the value D4(d0+d4) and larger by the value D6(d0+d4), respectively.

Hence, these voltage command values are used, whereby the inverter 22 operates on the basis of the voltage vectors V0, V4 and V6, which are adopted in periods that take a ratio d0:d4:(1−d0−d4), in both of the first section and the second section, which divide the cycle is into two. Then, the voltage vector V0 is adopted in a section including the timing at which the converter 21 commutates, whereby the converter 21 commutates in a state in which the DC current Idc does not flow. This is desirable from the viewpoint of reducing a loss in the commutation of the converter 21.

Note that regions where the DC current Idc and the line currents Ir, Is and It do not flow by the operation on the inverter 22 side are hatched in FIG. 18.

Moreover, with regard to the switching signals Sup, Svp and Swp, ON/OFF thereof are individually indicated by high/low of graphs. Note that switching signals Sun, Svn and Swn are omitted since these switching signals are on/off complementarily with the switching signals Sup, Svp and Swp, respectively (except for the dead time).

As described above, FIG. 18 shows the operations by the above-mentioned two-division control. Note that the timing at which the interrupt command R2 shown in FIG. 6 occurs is shown as a fall of a signal denoted by a symbol int in FIG. 18.

Figure 19:
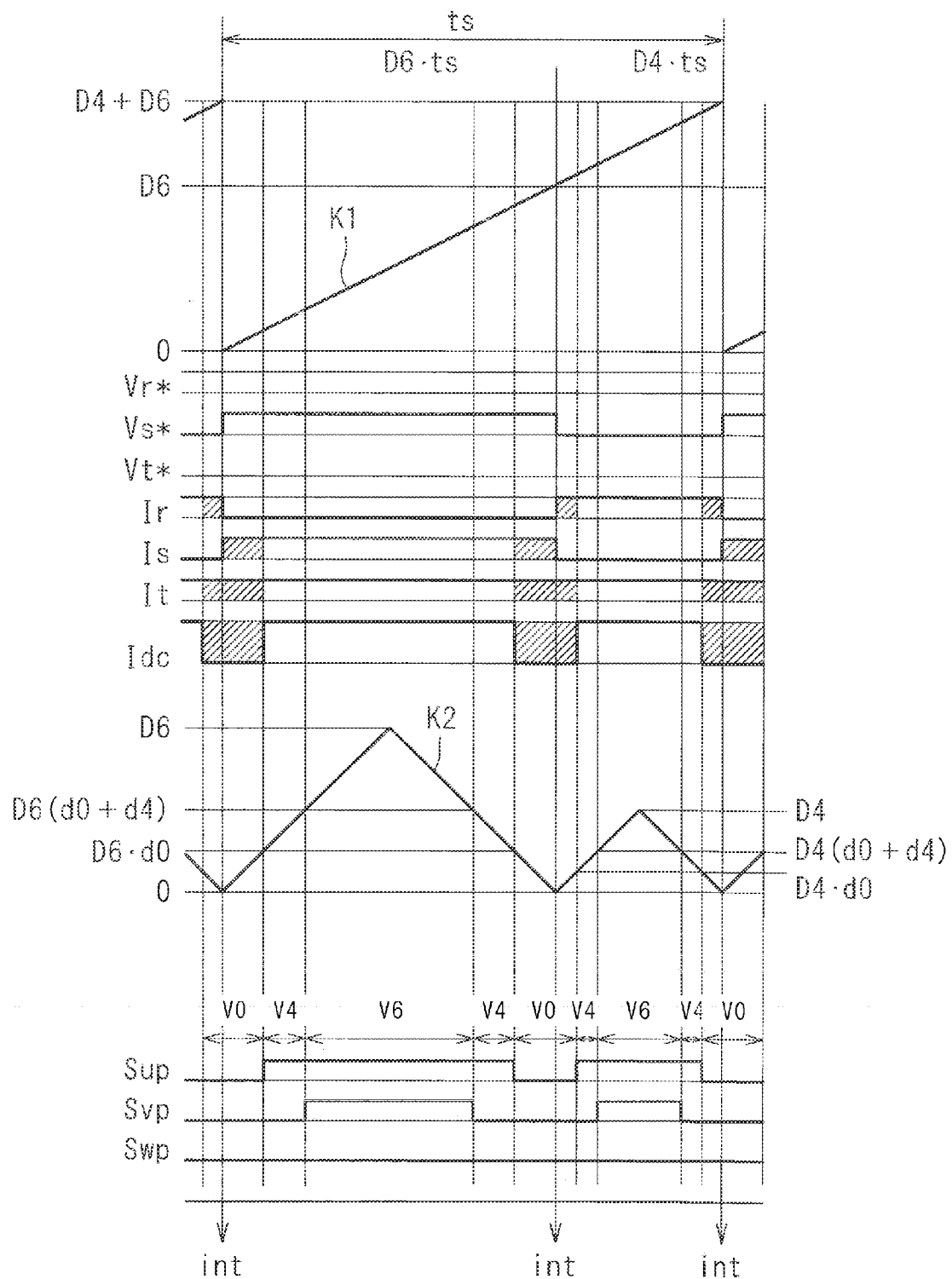
FIG. 19 is a graph showing operations of the power converter in the fourth embodiment.

FIG. 19 is a graph showing operations of the power converter 2 when the control shown in the first embodiment is applied in this embodiment.

The converter carrier K1 is compared with the flow ratio D6 corresponding to the converter threshold value Ccnv mentioned in the first embodiment and a commutation is done. The converter carrier K1 exhibits a sawtooth wave repeated in the cycle is corresponding to the first period length Tcnv, and here, a sawtooth wave inclined in rising is illustrated.

The first section and the length D6·ts thereof correspond to the second period Q1 and the second period length Tinv1, respectively. The second section and the length D4·ts thereof correspond to the second period Q2 and the second period length Tinv2, respectively.

The signal waves Vr*, Vs* and Vt* are voltage-source trapezoidal waves, and accordingly, the commutation of the converter 21 is performed by the same voltage vector as in the case shown in FIG. 18, and a switching pattern of the converter 21 also becomes the same as that of the comparative example shown in FIG. 18. Hence, as line currents Ir, Is and It obtained in this embodiment, the same ones as those in the comparative example shown in FIG. 18 are obtained.

In the first section corresponding to the second period Q1, the inverter carrier K2 is compared with the voltage command values D6·d0, D6(d0+d4) and D6, which correspond to the inverter threshold values Dpwm mentioned in the first embodiment. However, since the length of the second period Q1 is determined by the second period length Tinv1, the inverter carrier K2 takes the voltage command value D6 as the maximum value in the first section. Then, since the two-phase modulation is adopted here, a voltage command value D6(d0+d4+d6)=D6 as a comparison object of the inverter carrier K2 can be omitted. Whether or not such omission is present corresponds to the fact that there are a case where there are three types of the inverter threshold values Dpwm, and a case where there are two types thereof.

The inverter carrier K2 is compared with the voltage command values D4·d0, D4(d0+d4) and D6, which correspond to the inverter threshold values Dpwm mentioned in the first embodiment, in the second section corresponding to the second period Q2. However, since the second period Q2 is determined by the second period length Tinv2, the inverter carrier K2 takes the voltage command value D4 as the maximum value in the second section. Hence, the voltage command value D4=D4(d0+d4+d6) as a comparison object of the inverter carrier K2 can be omitted. Whether or not such omission is present also corresponds to the fact that there are a case where there are three types of the inverter threshold values Dpwm, and a case where there are two types thereof.

It is obvious that the periods in which the voltage vectors V0, V4 and V6 are adopted, the periods being obtained as described above, are obtained in the same way as in the case shown in FIG. 18 as long as the flow ratios D4 and D6 and the values d0, d4 and d6 are not changed. Note that the timing at which the interrupt command R2 shown in FIG. 7 occurs is shown as a fall of a signal denoted by a symbol int in FIG. 19.

It is understood that the first embodiment is applicable when, as described above, the converter 21 converts the three-phase AC voltages Vr, Vs and Vt into the DC voltage Vdc, and the inverter 22 outputs the multi-phase AC current Iv.

In this way, it is sufficient if the number of complementary PWM modulators required for the inverter switching signal Sinv is one. Moreover, unlike the case shown in Japanese Patent No. 4135026, in this way, it is not necessary to synthesize the inverter switching signal Sinv in the first section and the inverter switching signal Sinv in the second section with each other.

Furthermore, it is obvious that, in the graph shown in FIG. 19, a similar result is obtained even when the inclination of the converter carrier K1 is reversed, that is, is inclined in falling. Hence, it is obvious that the second embodiment in which the converter carrier K1 apparently becomes a triangular wave can also be applied to this embodiment.

As a matter of course, the third embodiment can also be applied to this embodiment. However, in this case, in a similar way to the converter threshold values Ccnv and CcnvB, which are described in the third embodiment, it follows that the converter carrier K1 is alternately compared with the flow ratios D6 and D4.

Fifth Embodiment

In a fifth embodiment, a description will be made of the case where the converter 21 converts a single-phase AC voltage into the DC voltage Vdc.

FIG. 20 is a block diagram illustrating a configuration of a power converter 2 adopted in this embodiment. In the power converter 2, a rectifier circuit composed of a full-wave rectifier diode bridge is adopted as the converter 21, and a voltage source inverter is adopted as the inverter 22. The power converter 2 further includes a power buffer circuit 4. Such a configuration itself is known by Japanese Patent Application Laid-Open No. 2011-193678 and the like.

The converter 21 is connected to a single-phase AC power supply 81. The single-phase AC power supply 81 can be understood as an example of the AC power supply 8 of FIG. 1.

The converter 21 and the power buffer circuit 4 are connected to the inverter 22 in parallel to each other by the DC power supply lines LH and LL. A potential higher than to the DC power supply line LL is applied to the DC power supply line LH.

The converter 21 includes diodes D31 to D34, which compose a bridge circuit. The converter 21 performs single-phase full-wave rectification for a single-phase AC voltage Vin inputted from the single-phase AC power supply 81, converts the single-phase AC voltage Vin into a rectified voltage Vrec(=|Vin|), and outputs the rectified voltage Vrec to the DC power supply lines LH and LL. The converter 21 receives a current irec from the single-phase AC power supply 81.

The power buffer circuit 4 includes a discharge circuit 4a and a charging circuit 4b, and exchanges power with the DC power supply lines LH and LL. The discharge circuit 4a includes a capacitor C4, and the charging circuit 4b boosts the rectified voltage Vrec and charges the capacitor C4.

The discharge circuit 4a further includes a transistor (here, insulated gate bipolar transistor: hereinafter abbreviated as "IGBT") Sc connected in antiparallel to a diode D42. The transistor Sc is connected in series to the capacitor C4 between the DC power supply lines LH and LL on the DC power supply line LH side. The transistor Sc and the diode D42 can be collectively regarded as a single switch Sc. By conduction of the switch Sc, the capacitor C4 is discharged, and gives power between the DC power supply lines LH and LL. Opening and closing of the switch Sc is controlled by a signal SSc from the power converter control device 1. Note that the switch Sc is made conductive in the non-division control.

For example, the charging circuit 4b includes a diode D40, a reactor L4, and a transistor (here, IGBT) Sl. The diode D40 includes a cathode and an anode, and the cathode is connected between a first switch and the capacitor C4. Such a configuration is known as a so-called boost chopper.

A diode D41 is connected in antiparallel to the transistor Sl, and both of them can be collectively regarded as a single switch Sl.

The capacitor C4 is charged by the charging circuit 4b, and a both-end voltage Vc higher than the rectified voltage Vrec is generated in the capacitor C4. That is, the power buffer circuit 4 functions as a booster circuit, and whether or not the power buffer circuit 4 contributes to the DC voltage Vdc is determined by the switch Sc. By opening and closing of the switch Sc, switching is made as to whether the DC current Idc flowing through the DC power supply lines LH and LL is to flow from the power buffer circuit 4 or is to flow from the full-wave rectifier diode bridge.

Since an output of the power buffer circuit 4 is also a DC voltage, the power buffer circuit 4 can also be considered to be included in the converter 21. In this case, it can be understood that the converter 21 commutates the DC current Idc by opening and closing the switch Sc.

Since the configuration and operations of the inverter 22 are the same as those in the fourth embodiment, a description thereof will be omitted here.

FIG. 21 is a circuit diagram showing an equivalent circuit of the circuit shown in FIG. 20. In the equivalent circuit, a current irec1 is represented equivalently as a current irec1 passing through a switch Srec when the switch Srec conducts. In a similar way, a discharge current ic is represented equivalently as a current ic passing through a switch Sc when the switch Sc conducts.

Moreover, the current flowing to the load 3 via the inverter 22 when the connecting points Pu, Pv and Pw in the inverter 22 are commonly connected to either one of the DC power supply lines LH and LL is also equivalently represented as a zero-phase current iz flowing through the switch Sz. Moreover, in FIG. 21, the reactor L4, the diode D40 and the switch Sl, which compose the charging circuit 4b, are shown, and a current it flowing through the reactor L4 is additionally written.

In the equivalent circuit thus obtained, duties drec, dc and dz, with which the switches Srec, Sc and Sz conduct, are introduced, and drec+dc+dz=1 is established. Here, $0 \leq drec \leq 1$, $0 \leq dc \leq 1$, and $0 \leq dz \leq 1$ stand.

The DC current Idc is the sum of the currents irec1, ic and iz, which cause the switches Srec, Sc and Sz to conduct, respectively. Moreover, since the currents irec1, ic and iz are obtained by multiplying the DC current Idc by the duties drec, dc and dz, respectively, these currents irec1, ic and iz are average values in switching cycles of the switches Srec, Sc and Sz.

The duty drec is a duty that sets a period while the converter 21 is capable of flowing the current to the inverter 22, and accordingly, is referred to as the rectification duty drec. Moreover, the duty dc is a duty with which the capacitor C4 is discharged, and accordingly, is referred to as the discharge duty dc. Furthermore, the duty dz is a duty with which the zero-phase current iz always flows in the inverter 22 regardless of the voltage outputted therefrom, and accordingly, is referred to as the zero duty dz.

An example of the operations of the power converter 2 having such a configuration is described in detail by Japanese Patent Application Laid-Open No. 2011-193678, and accordingly, is omitted here. In order to be compared with this embodiment, a graph showing the operations of this example is just shown in FIG. 22.

Figure 22:
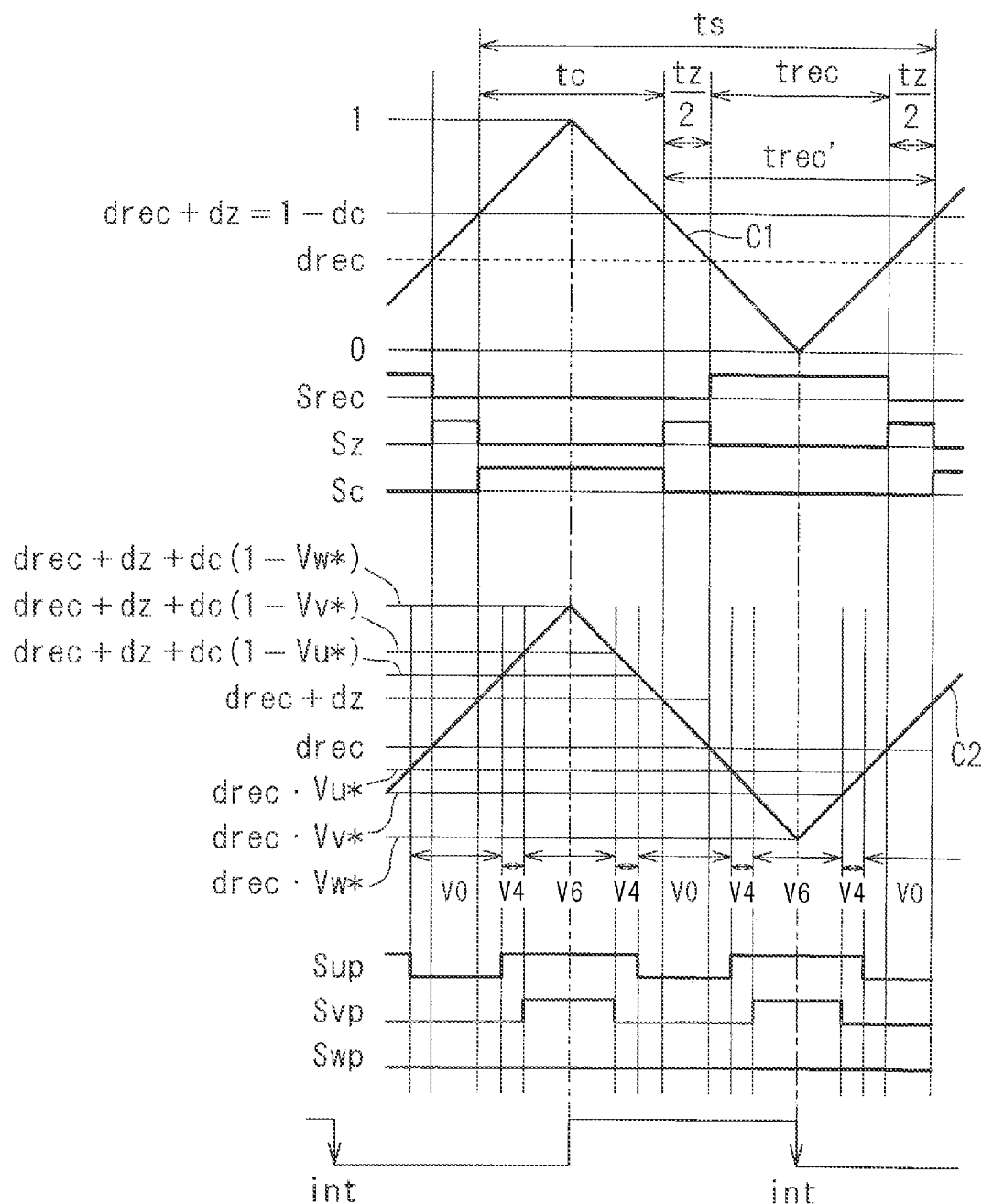
FIG. 22 is a graph showing operations of a power converter when compared with the fifth embodiment.

That is, FIG. 22 is a graph showing the operations of the power converter 2 in order to be compared with this embodiment. ON/OFF of the switches Srec, Sc and Sz are individually indicated by high/low of graphs. The cycle is of the symmetric triangular wave C1 is divided by a ratio of the rectification duty drec, the discharge duty dc, and the zero duty dz.

The zero duty dz depends on the operations of the inverter 22. Moreover, since the full-wave rectifier diode bridge is adopted for the converter 21, the rectification duty drec is passively determined by the discharge duty dc and the zero duty dz. That is, it is the discharge duty dc that is controlled in the converter 21. Therefore, as a comparison object of the symmetric triangular wave C1, a value obtained by subtracting the discharge duty dc from 1 is referred to as a discharge complementation duty (1−dc), and this is adopted.

Unlike the fourth embodiment, the cycle ts is also divided by two periods tz/2(=dz·ts/2) as well as periods tc(=dc·ts) and trec(=drec·ts). That is, a period in which the symmetric triangular wave C1 becomes equal to or larger than the discharge complementation duty (1−dc) is a period tc, a period in which the symmetric triangular wave C1 becomes equal to or less than the rectification duty drec is the period trec, and a period in which the symmetric triangular wave C1 becomes equal to or larger than the rectification duty drec and equal to or less than the discharge complementation duty (1−dc) are present as two periods tz/2.

Note that a desirable way of selecting the discharge duty dc is well known, and accordingly, is omitted here. However, the first period length Tcnv, the converter carrier K1, and the converter threshold value Ccnv, which are described in the above-described "(b-2) Operation explanation of comparative example", correspond to the cycle ts, the symmetric triangular wave C1, and the discharge complementation duty (1−dc), respectively (refer to FIG. 6).

In FIG. 22, a symmetric triangular wave C2 takes the minimum value 0 and the maximum value 1. The symmetric triangular wave C2 is compared with voltage command values drec·Vw*, drec·Vv*, drec·Vu*, drec+dz, drec+dz+dc (1−Vu*), drec+dz+dc(1−Vv*), and drec+dz+dc(1−Vw*). The inverter carrier K2 and the inverter threshold values Dpwm, which are described in the above-described "(b-2) Operation explanation of comparative example", correspond to the symmetric triangular wave C2 and the voltage command values, respectively (refer to FIG. 6).

FIG. 22 shows a case where so-called two-phase modulation is performed, in which Vw*=0 is adopted. In this case, the voltage command values drec·Vw* and drec+dz+dc(1−Vw*) become 0 and 1, respectively, which match with the minimum value and maximum value of the symmetric triangular wave C2, respectively. Hence, when the two-phase modulation is performed, the voltage command values drec·Vw* and drec+dz+dc(1−Vw*) can be omitted.

The voltage command value drec·Vy* is smaller than the rectification duty drec by a value drec(1−Vy*), and the voltage command value drec+dz+dc(1−Vy*) is smaller than the discharge complementation duty (1−dc) (=drec+dz) by a value dc(1−Vy*) (as mentioned above, the symbol y represents the symbols u, v and w).

The switching signals Sup, Svp and Swp are illustrated in a similar way to the fourth embodiment, and the switching signals Sun, Svn and Swn are omitted.

Hence, by using these voltage command values, the inverter 22 operates on the basis of the voltage vectors V0, V4 and V6, which are adopted in periods at a ratio (1−Vu*):(Vu*−Vv*):(Vv*−Vw*) in both of the periods tc and trec in the cycle ts, and the voltage vector V0 is adopted in the sections including the timing at which the converter commutates (the sections also include the periods tz/2), whereby the converter commutates in a state in which the DC current Idc does not flow.

Hence, if the pair of periods tz/2 and the period trec are collectively considered as a period trec', FIG. 22 shows the above-mentioned two-division control. Note that a fall of the signal, which is denoted by the symbol int, indicates a trough interrupt corresponding to the interrupt command R2 shown in FIG. 6.

Figure 23:
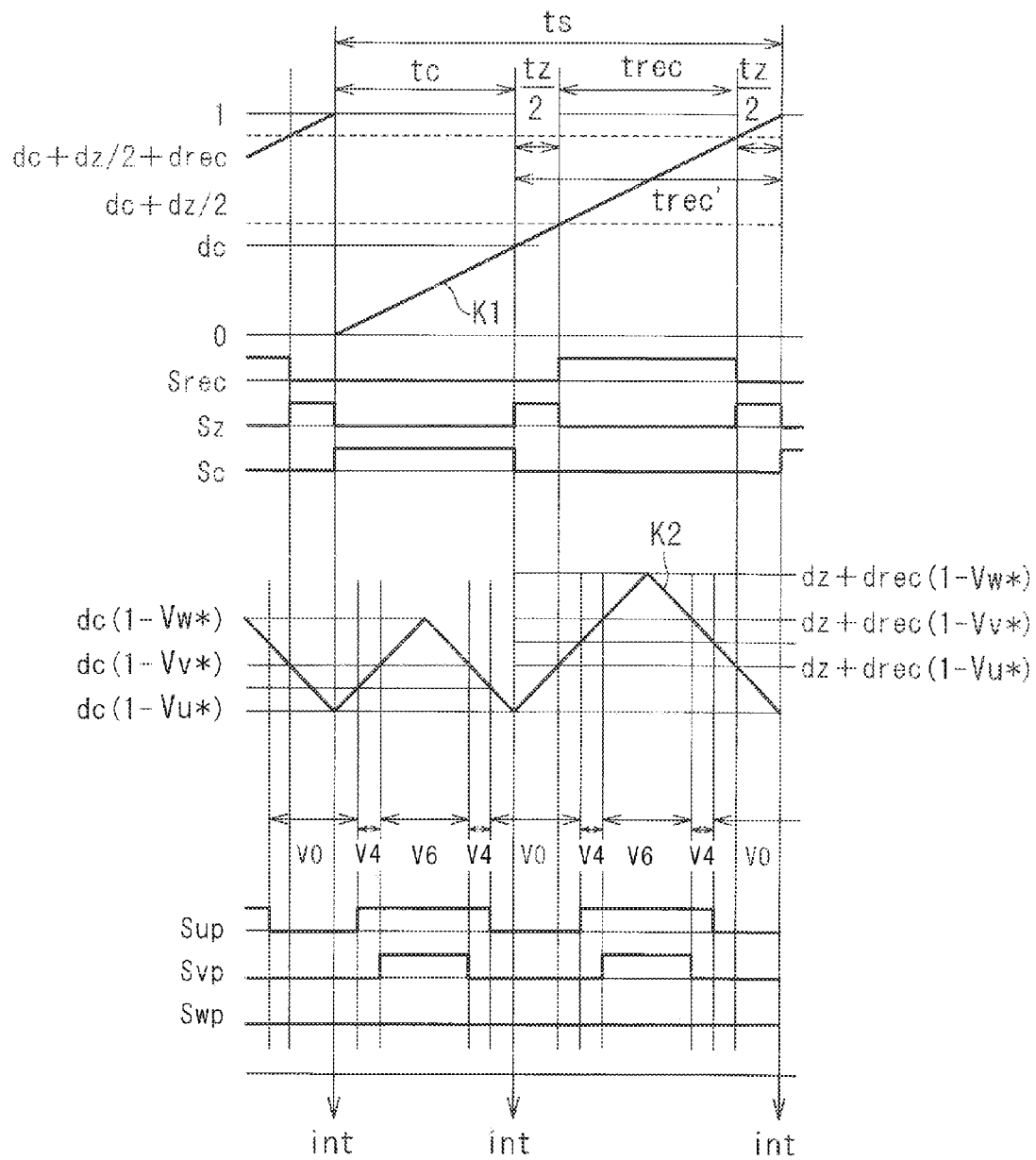
FIG. 23 is a graph showing operations of a power converter of the fifth embodiment.

FIG. 23 is a graph showing operations of the power converter 2 when the control shown in the first embodiment is applied in this embodiment.

The converter carrier K1 is compared with the discharge duty dc corresponding to the converter threshold value Ccnv mentioned in the first embodiment. The converter carrier K1 exhibits a sawtooth wave repeated in the cycle is corresponding to the first period length Tcnv, and here, a sawtooth wave inclined in rising is illustrated.

The period tc and a length dc·ts thereof correspond to the second period Q1 and the second period length Tinv1, respectively. The period trec' and a length (1−dc)·ts (=(tz/2+trec+tz/2)·ts) thereof correspond to the second period Q2 and the second period length Tinv2, respectively.

Specifically, a period while the converter carrier K1 becomes equal to or less than the discharge duty dc is the period tc, and a period while the converter carrier K1 becomes equal to or larger than the discharge duty dc is the period trec'. The switch Sc is opened and closed so that the switch Sc is conductive when the converter carrier K1 is equal to or less than the discharge duty dc. Hence, the discharge duty dc corresponds to the converter threshold value Ccnv, and the signal SSc for controlling the opening and closing of the switch Sc corresponds to the converter switching signal Scnv.

Note that there are also shown: the period trec while the converter carrier K1 becomes equal to or larger than the value (dc+dz/2) and equal to or less than the value (drec+dc+dz/2); and the two periods tz/2 while the converter carrier K1 becomes equal to or larger than the discharge duty dc and equal to or less than the value (dc+dz/2), or becomes equal to or larger than the value (drec+dc+dz/2) and becomes equal to or less than the value 1 (=drec+dc+dz).

In the period tc corresponding to the second period Q1, the inverter carrier K2 is compared with voltage command values dc(1−Vu*), dc(1−Vv*) and dc(1−Vw*), which correspond to the inverter threshold values Dpwm mentioned in the first embodiment.

The second period Q1 is determined by the second period length Tinv1, and the inverter carrier K2 takes the discharge duty dc as the maximum value in the period tc. Here, the two-phase modulation is adopted, and the voltage command value dc(1−Vw*) is equal to the discharge duty dc. Hence, the voltage command value dc(1−Vw*) as a comparison object of the inverter carrier K2 can be omitted. Whether or not such omission is present corresponds to the fact that there are a case where there are three types of the inverter threshold values Dpwm, and a case where there are two types thereof.

In the period trec' corresponding to the second period Q2, the inverter carrier K2 is compared with voltage command values dz+drec(1−Vu*), dz+drec(1−Vv*) and dz+drec(1−Vw*), which correspond to the inverter threshold values Dpwm mentioned in the first embodiment.

The second period Q2 is determined by the second period length Tinv2, and the inverter carrier K2 takes the discharge complementation duty (1−dc)(=dz+drec) as the maximum value in the period trec'. Here, the two-phase modulation is adopted, and the voltage command value dz+drec(1−Vw*) is equal to the discharge complementation duty (1−dc). Hence, the voltage command value dz+drec(1−Vw*) as a comparison object of the inverter carrier K2 can be omitted. Whether or not such omission is present also corresponds to the fact that there are a case where there are three types of the inverter threshold values Dpwm, and a case where there are two types thereof.

Here, for the inverter 22-side complementary PWM modulator by the MTUs 3 and 4, sawtooth wave modulation of the switch Sc is used together by using the MTU0, and synchronization is achieved by a synchronous start function of the timer.

TABLE 1

RX62T MTU3

| Counters | I/O | Output signal | TGR | register | TGR/TBR | buffer | Function |
|---|---|---|---|---|---|---|---|
| MTU0 | MTIOC0A, B, C, D | SSc, —, —, — | TGRA, TGRB, TGRE | SSc*, carr, — | TGRC, TGRD, TGRF | SSc0*, carr0, — | PWM mode 1 |
| MTU1 | MTIOC1A, B | | TGRA, TGRB | | — | | |
| MTU2 | MTIOC2A, B | | TGRA, TGRB | | — | | |
| MTU3 | MTIOC3A, B, C, D | Carr, U, —, X | TGRA, TGRB | carr + td, U* | TGRC, TGRD, TGRE | carr + td0, U0*, — | Complementary PWM |
| MTU4 | MTIOC4A, B, C, D | V, W, Y, Z | TGRA, TGRB | V*, W* | TGRC, TGRD, TGRE, TGRF | V0*, W0*, —, — | Complementary PWM |
| MTU5 | MTIC5U, V, W | | TGRU, TGRV, TGRW | | — | | |
| MTU6 | MTIOC6A, B, C, D | | TGRA, TGRB | | TGRC, TGRD, TGRE | | |
| MTU7 | MTIOC7A, B, C, D | | TGRA, TGRB | | TGRC, TGRD, TGRE, TGRF | | |

It is obvious that the periods in which the voltage vectors V0, V4 and V6 are adopted, the periods being obtained as described above, are obtained in the same way as in the case shown in FIG. 22. Note that the timing at which the interrupt command R2 shown in FIG. 7 occurs is shown as a fall of a signal denoted by a symbol int in FIG. 23.

It is understood that the first embodiment is applicable when, as described above, the converter 21 and the power buffer circuit 4 convert the single-phase AC voltage Vin into the DC voltage Vdc, and the inverter 22 outputs the multi-phase AC current Iv.

Furthermore, it is obvious that, in the graph shown in FIG. 23, a similar result can be obtained even when the inclination of the converter carrier K1 is reversed, that is, is inclined in falling. Hence, it is obvious that the second embodiment in which the converter carrier K1 apparently becomes a triangular wave can also be applied to this embodiment.

As a matter of course, the third embodiment can also be applied to this embodiment. However, in this case, in a similar way to the converter threshold values Ccnv and CcnvB, which are described in the third embodiment, the converter carrier K1 is alternately compared with the discharge duty dc and the discharge complementation duty (1−dc).

EXAMPLE

A description will be made of a case where a single-chip microcomputer RX62T made by Renesas Technology Corporation is used for the fifth embodiment. As shown in Table 1, the single-chip microcomputer RX62T can compose two sets of complementary PWM modulators by using, among 8-Ch multi-function timer pulse units (hereinafter, "MTUs"), the MTUs 3 and 4 and the MTUs 6 and 7 (for details, refer to Renesas Electronics Application Note: RX62T Group—Usage Example of 12-Bit AD Converter in One Shunt Current Detection Method, R01AN0821JJ0100 and Renesas Electronics Application Note: RX62T-MTU3 Complementary PWM mode, R01AN0731JT0101 for example).

More specifically, in the MTU0, the PWM 1 mode is adopted, and the values SSc* and can stored in the compare registers TGRA and TGRB are transferred from the values SSc0* and carr0 written in the buffer registers TGRC and TGRD, which correspond to the converter threshold value Ccnv and the first period length Tcnv, respectively.

The MTU0 outputs the signal SSc corresponding to the converter switching signal Scnv from an input/output terminal MTIOC0A, and controls the opening and closing of the switch Sc in the fifth embodiment. Specifically, when the signal SSc is "H", the switch Sc becomes conductive, and when the signal SSc is "L", the switch Sc becomes non-conductive.

In the MTU3 and the MTU 4, a complementary PWM mode is adopted. Values U*, V* and W*, which are stored in a compare register TGRB of the MTU3 and compare registers TGRA and TGRB of the MTU4, are values transferred from values U0*, V0* and W0*, written in a buffer register TGRE of the MTU3 and buffer registers TGRC and TGRD of the MTU4, respectively, and correspond to the inverter threshold values Dpwm. A value (carr+td) stored in the compare register TGRA of the MTU 3 is a value transferred from a value (carr+td0) stored in a buffer register TGRC of the MTU3, and corresponds to the second period length Tinv.

Signals U, X, V, W, Y and Z, which correspond to the switching signals Sup, Sun, Svp, Svn, Swp and Swn, are outputted from input/output terminals MTIOC3B and MTIOC3D of the MTU3 and input/output terminals MTIOC4A, MTIOC4B, MTIOC4C and MTIOC4D of the MTU4, respectively. From an input/output terminal MTIOC3A of the MTU3, a toggle output can synchronized with the cycle corresponding to the second periods Q1 and Q2 is outputted.

Note that the above-mentioned compare registers and buffer registers of the MTU0, the MTU3 and the MTU4 are all realized by timer general registers (denoted by a symbol "TGR" in Table 1).

FIG. 24 is a graph showing behaviors of the toggle output can and the signals SSc, U, X, V, W, Y and Z when a period (period tc) while the power buffer circuit 4 contributes to the DC voltage Vdc is ⅓ of a period (period trec') while the power buffer circuit 4 does not contribute to the DC voltage Vdc. All of these signals are "H" active.

The Value SSc0* is set to ⅓ of the value carr0, and these values are given to the buffer registers of the MTU0. In the MTU3 and the MTU4, the cycle of the inverter carrier K2 is updated at a rise of the toggle output carr corresponding to the trough of the inverter carrier K2. In this way, the synchronous PWM control between the converter 21 and the inverter 22 is realized.

Then, in a period (corresponding to the voltage vector V0) while the signals U, V and W become "H" and the signals X, Y and Z become "L", the toggle output carr rises, and the switch Sc switches. Hence, since the switch Sc is opened and closed at the point of time when the DC current Idc does not flow, a loss in the opening and the closing is reduced.

Note that, in FIG. 24, handling of the periods tz/2 is not clearly stated. However, with regard to consideration of the zero duty dz, for example, the zero duty dz can be taken into consideration, for example, by setting, to dz·ts, a portion corresponding to a value td0 in the value (carr+td0) stored in the buffer register TGRC of the MTU3.

Moreover, FIG. 24 illustrates the case where the inverter 22 operates by the signals U, X, V, W, Y and Z based on the three-phase modulation. However, it is desirable to adopt the two-phase modulation from the viewpoint of reducing the switching loss of the inverter 22.

The above-described embodiments can be modified in combination with one another as long as respective functions thereof are not disturbed. Such modifications are also incorporated in the present invention.

Furthermore, in the above-described embodiments and the modifications thereof, the power converter control device 1 itself can be understood as an invention, and in addition, the present invention can also be understood as a control method for controlling the power converter control device 1 including the converter control unit 11 and the inverter control unit 12.

Although the description has been made of the present invention in detail, the above description is an illustration in all aspects, and the present invention is not limited to this. It is interpreted that unillustrated countless modification examples are imaginable without departing from the scope of the present invention.

The invention claimed is:

1. A power converter control device for controlling a power converter including a converter that performs AC-DC conversion and an inverter that receives a DC voltage from said converter and supplies a multi-phase AC current, said power converter control device comprising:
a converter control unit that outputs a converter switching signal for determining switching of said converter based on a result of performing comparison between a converter carrier and a converter threshold value in each of first periods repeated while having a first period length; and
an inverter control unit that outputs an inverter switching signal for determining switching of said inverter based on a result of performing comparison between an inverter carrier and an inverter threshold value in each of second periods synchronized with said converter carrier and repeated while having a second period length,
wherein, in said first period, first data and second data are alternately given to said inverter control unit, said first data including a first value indicating a length of time from a start point of time of said first period to a matching point of time as a point of time when said converter carrier takes said converter threshold value and said inverter threshold value corresponding to said second period having said first value as said second period length, and said second data including a second value indicating a length of time from said matching point of time to an end point of time of said first period and said inverter threshold value corresponding to said second period having said second value as said second period length.

2. The power converter control device according to claim 1, further comprising:
an arithmetic processing unit that performs arithmetic processing for obtaining said first data and said second data for a pair of said second periods, said arithmetic processing being performed every said first period,
wherein said inverter control unit includes:
a buffer register which stores said inverter threshold value and said second period length;
a compare register to which contents stored by said buffer register are transferred at a boundary point of time as a point of time serving as a boundary between said second periods;
a timer that generates a count value that is compared with said second period length stored in said compare register and becomes said inverter carrier; and
a switching signal generation unit that generates said inverter switching signal on the basis of the result of said comparison between said inverter threshold value stored in said compare register and said inverter carrier, and
said first data obtained by said arithmetic processing in one of said first periods is stored in said buffer register before the start of another of said first periods, said second data obtained by said arithmetic processing in said one of said first periods is stored in said buffer register on an occasion of the start of said another of said first periods, and said another of said first periods is present immediately after said one of said first periods.

3. The power converter control device according to claim 2,
wherein said first data
(a) on and after an end time of said arithmetic processing when said boundary point of time is present after the start of said arithmetic processing and before the end of said arithmetic processing,
(b) when said boundary point of time is not present after the start of said arithmetic processing and before the end of said arithmetic processing, by processing by an interrupt command occurring at a first one of said boundary point of time after the end of said arithmetic processing,
is stored in said buffer register in these individual cases.

4. The power converter control device according to claim 3,
wherein said first data
(a1) is stored in said buffer register at the time when said arithmetic processing is ended when said boundary point of time is present after the start of said arithmetic processing and before the end of said arithmetic processing.

5. The power converter control device according to claim 3,
wherein said first data
(a2) when said boundary point of time is present after the start of said arithmetic processing and before the end of said arithmetic processing, is stored in said buffer register by interrupt handling by an interrupt command occurring at a first one of said boundary point of time after the end of said arithmetic processing.

6. The power converter control device according to claim 1, wherein said inverter carrier exhibits a single triangular wave in each of said second periods.

7. The power converter control device according to claim 1,
wherein said converter carrier repeats a monotonic increase and a monotonic decrease every said first period, and
said inverter carrier repeats a monotonic increase and a monotonic decrease every said second period.

8. The power converter control device according to claim 1, wherein said converter carrier exhibits a sawtooth wave having said first period length as a cycle, and
said inverter carrier repeats a monotonic increase and a monotonic decrease every said second period.

9. The power converter control device according to claim 1, wherein said converter is a current source converter, and commutates at said matching point of time by said converter switching signal.

10. The power converter control device according to claim 1, wherein said converter includes a rectifier circuit and a booster circuit, and it is determined whether or not said booster circuit contributes to said dc voltage on the basis of said converter switching signal.

* * * * *